United States Patent
Balasubramanian et al.

(10) Patent No.: US 11,870,722 B2
(45) Date of Patent: Jan. 9, 2024

(54) MULTIPLE RECONFIGURABLE INTELLIGENT SURFACE ASSISTED SIDELINK RANGING AND POSITIONING

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Junyi Li, Fairless Hills, PA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/409,689

(22) Filed: Aug. 23, 2021

(65) Prior Publication Data

US 2023/0055627 A1    Feb. 23, 2023

(51) Int. Cl.
*H04W 72/04*      (2023.01)
*H04W 76/00*      (2018.01)
*H04L 5/00*       (2006.01)

(52) U.S. Cl.
CPC .................. *H04L 5/0048* (2013.01)

(58) Field of Classification Search
CPC ..... H04L 5/0048; G01S 1/042; G01S 5/0268; G01S 13/765; G01S 13/876; G01S 5/10; G01S 5/0273; H04W 4/44; H04W 4/02
USPC ........................................... 370/329
See application file for complete search history.

(56) References Cited

U.S. PATENT DOCUMENTS

2021/0302561 A1*  9/2021  Bayesteh .............. G01S 5/0273
2023/0057620 A1*  2/2023  Wu ..................... H04W 56/004

FOREIGN PATENT DOCUMENTS

CN          113163325 A  *  7/2021  ............ H04W 16/28
WO      WO-2021197218 A1  * 10/2021

OTHER PUBLICATIONS

Beixiong Zheng et al. (Efficient Channel Estimation for Double-IRS Aided Multi-User MIMO System, Jun. 2021) (Year: 2021).*
Jingwen Zhang et al. ( Positioning with Dual Reconfigurable Intelligent Surfaces in Millimeter-Wave MIMO Systems, 2020 ) (Year: 2020).*

(Continued)

*Primary Examiner* — Maharishi V Khirodhar
(74) *Attorney, Agent, or Firm* — QUALCOMM Incorporated

(57) ABSTRACT

Aspects presented herein may enable one or more wireless devices to perform a sidelink-based ranging and/or positioning with an assistance of an RIS. In one aspect, a first wireless device receives an information indicating at least a time in which at least one RIS is to be activated. The first wireless device transmits a first set of reference signals to a second wireless device via the at least one RIS. The first wireless receives a second set of reference signals transmitted from the second wireless device via the at least one RIS. The first wireless calculates a first signal RTT based on the first set of reference signals and the second set of reference signals.

30 Claims, 16 Drawing Sheets

(56) References Cited

OTHER PUBLICATIONS

Al-Hilo A., et al., "Reconfigurable Intelligent Surface Enabled Vehicular Communication: Joint User Scheduling and Passive Beamforming", arxiv.org, Cornell University Library, 201 OLIN Library Cornell University Ithaca, NY, 14853, Jan. 28, 2021, pp. 1-12, XP081870300, abstract, p. 1, paragraph I-p. 3, paragraph III, figure 1.
International Search Report and Written Opinion—PCT/US2022/037923—ISA/EPO—dated Oct. 10, 2022.
Wymeersch H., et al., "Radio Localization and Mapping with Reconfigurable Intelligent Surfaces: Challenges, Opportunities, and Research Directions", IEEE Vehicular Technology Magazine, IEEE, US, vol. 15, No. 4, Oct. 7, 2020, 10 Pages, pp. 52-61, XP011821427, the whole document, abstract p. 52, right-hand col., para. 1-p. 55, left-hand col., para. 3, p. 57, right-hand col., para. 1-p. 58, right-hand col., para. 2 fig. 1,2,4-p. 59, right-hand col., last para. fig. 1-4.
Zhang J., et al., "Positioning with Dual Reconfigurable Intelligent Surfaces in Millimeter-Wave MIMO Systems", 2020 IEEE/CIC International Conference on Communications in China (ICCC), IEEE, Aug. 9, 2020, XP033853278, pp. 800-805, DOI: 10.1109/ICCC49849.2020.9238887, the whole document, pp. 1-3, 6, abstract, p. 800, paragraph I-p. 801, paragraph II, p. 802, paragraph III.

\* cited by examiner

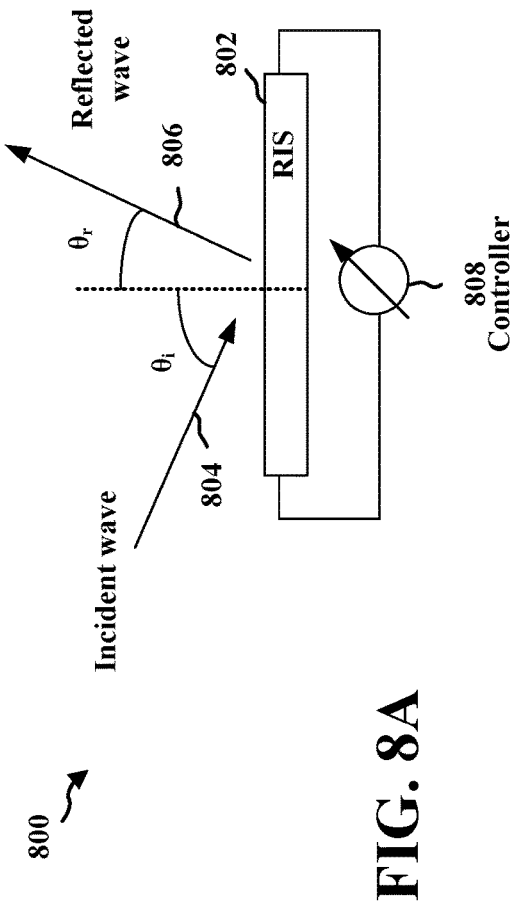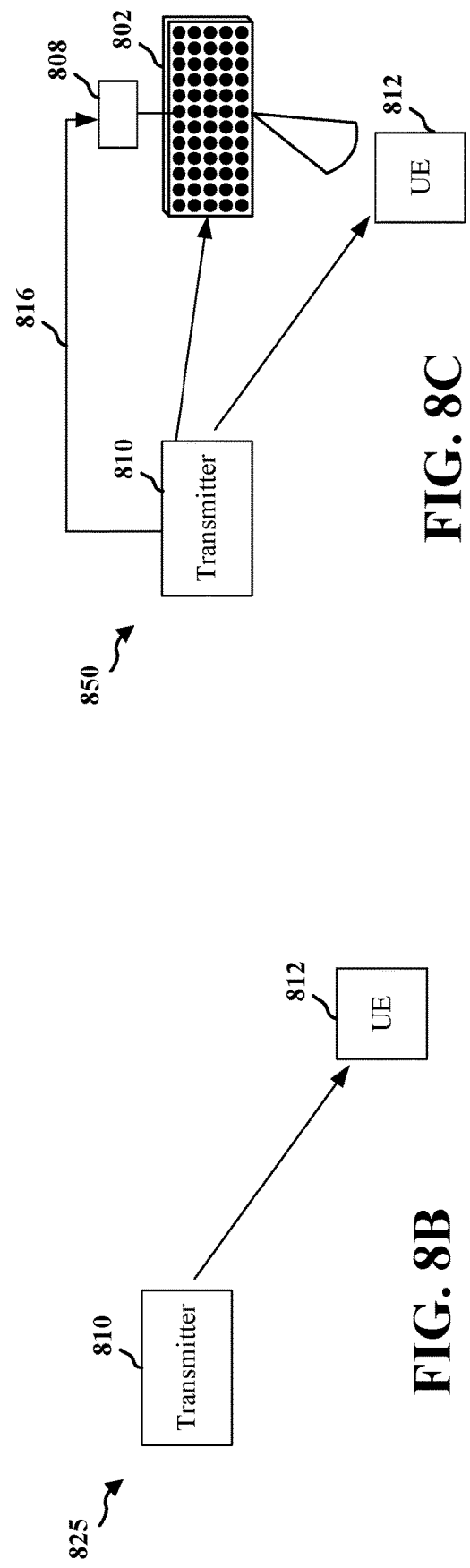
FIG. 8A
FIG. 8B
FIG. 8C

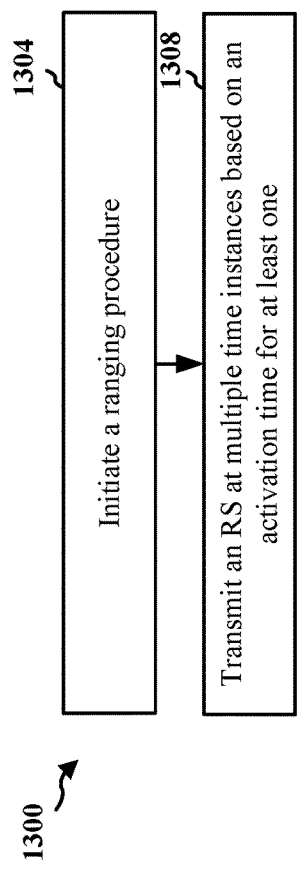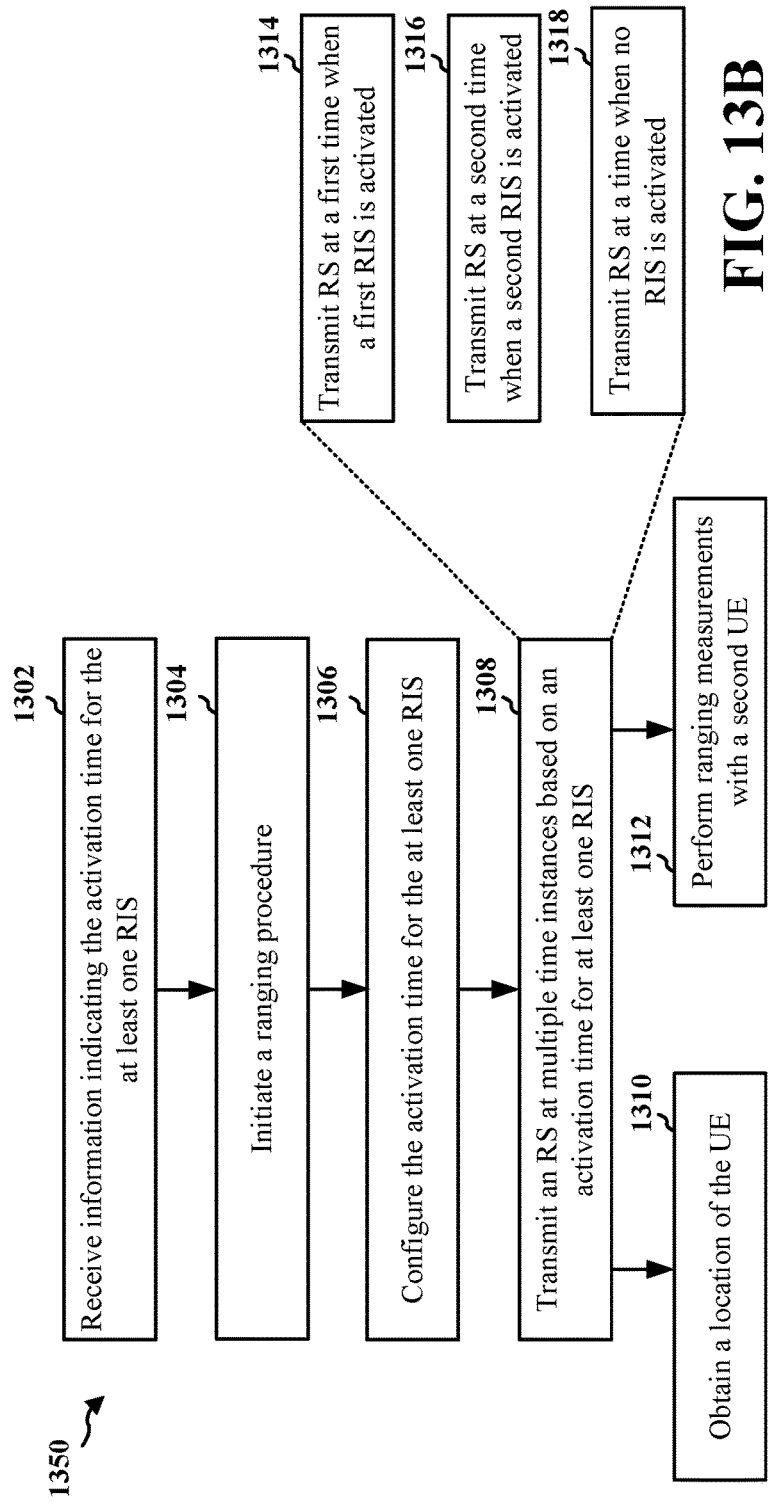

MULTIPLE RECONFIGURABLE INTELLIGENT SURFACE ASSISTED SIDELINK RANGING AND POSITIONING

TECHNICAL FIELD

The present disclosure relates generally to communication systems, and more particularly, to wireless communication involving a reconfigurable intelligent surface.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise communication that is reflected by an RIS. Improvements provided herein improve communication involving an RIS and may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives initiates a ranging operation and transmits a reference signal at multiple time instances based on an activation time for at least one reconfigurable intelligent surface (RIS).

In an aspect of the disclosure, a method, a computer-readable medium, and an apparatus are provided for wireless communication. The apparatus receives an initiation of a ranging procedure from a UE and configures at least one RIS with an activation and deactivation pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A, 8B, and 8C illustrate example aspects of an RIS.

FIGS. 13A and 13B are flowcharts of methods of wireless communication.

DETAILED DESCRIPTION

Figure 1:
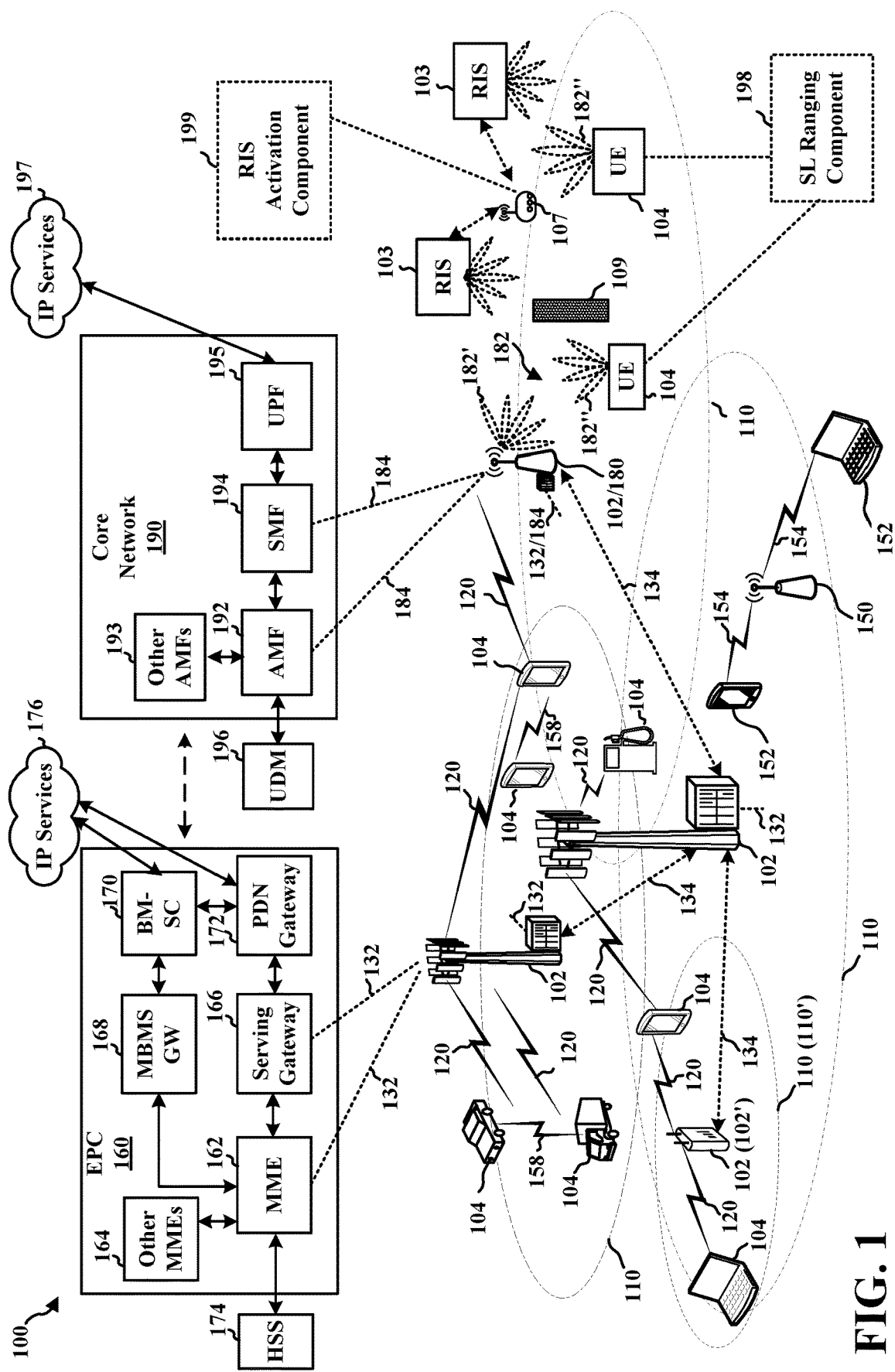
FIG. 1 is a diagram illustrating an example of a wireless communications system and an access network.

Aspects presented herein may improve the efficiency and performance of sidelink ranging or positioning. Aspects presented herein may improve the accuracy of ranging based on RTT of transmitted/received PRSs through the assistance of multiple RISs. A UE may perform a ranging procedure to determine a range to a second UE. However, there may not be a line of sight (LOS) path between the two UEs due to a blockage. The blockage may affect the reception of a positioning reference signal (PRS) and may reduce the accuracy of ranging measurements. An RIS may be used to improve reception of the PRS around the blockage, but may introduce additional time in a RTT calculation. Aspects presented herein provide for improved accuracy of ranging and positioning measurements by a UE transmitting a PRS at multiple times, each time corresponding to a time at which one of multiple RISs is activated. The UE may measure RTT based on each PRS transmission and may use the set of measurements to determine a range to a second UE or to determine a location of the UE. For example, the UE may determine the range or location based on a minimum RTT from the measurement with the multiple RISs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, RISs 103, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. In some aspects, the RIS 103 may reflect beamformed communication between devices, including between a base station and a UE or between a first UE and a second UE. The reflection via the RIS 103 may help to avoid a blockage 109 that blocks a directional beam between the base station 102 or 180 and the UE 104 or between a first UE and a second UE.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In certain aspects, a UE 104 may include an SL ranging component 198 configured to perform an SL ranging with another UE with an assistance of an RIS. In one configuration, the SL ranging component 198 may be configured to initiate a ranging operation and transmit a reference signal at multiple time instances based on an activation time for at least one MS. For example, the SL ranging component 198 may be configured to transmit the reference signal during a first time that an RIS is activated and during a second time that the RIS is deactivated. The UE may use measurements of the time difference of arrival (TDOA) or round trip time (RTT) for the RS at the two time instances to perform ranging or positioning for the UE. In some aspects, the SL ranging component 198 may be configured to transmit a reference signal, such as a positioning reference signal (PRS) during times when RISs at different locations are activated and measure the RTT with each of the RISs to obtain the UE's location.

An RIS activation component 199 may be configured to receives an initiation of a ranging procedure from a UE 104 and configure at least one RIS 103 with an activation and deactivation pattern. FIG. 1 illustrates an example in which an RSU 107 may include the RIS activation component.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
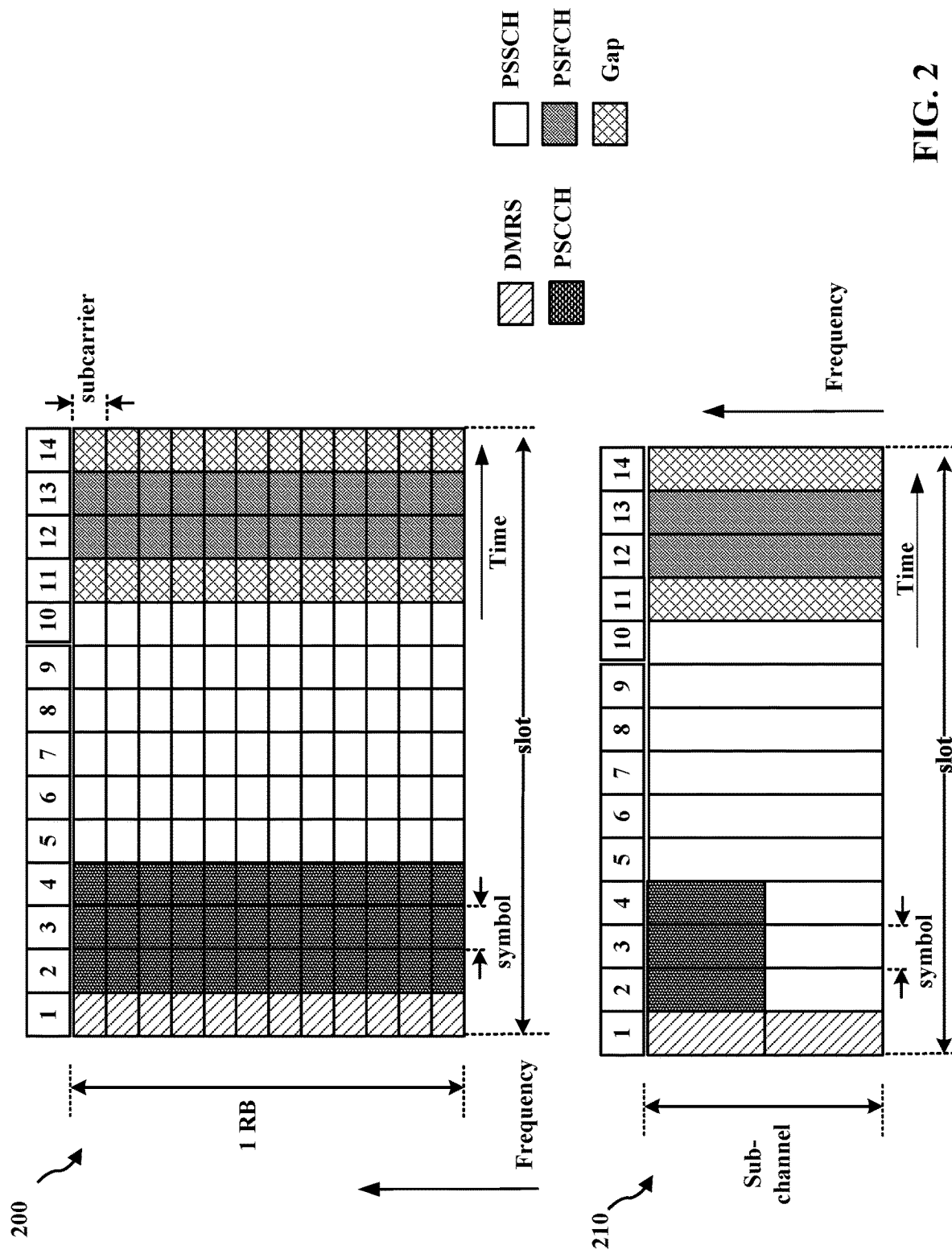
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
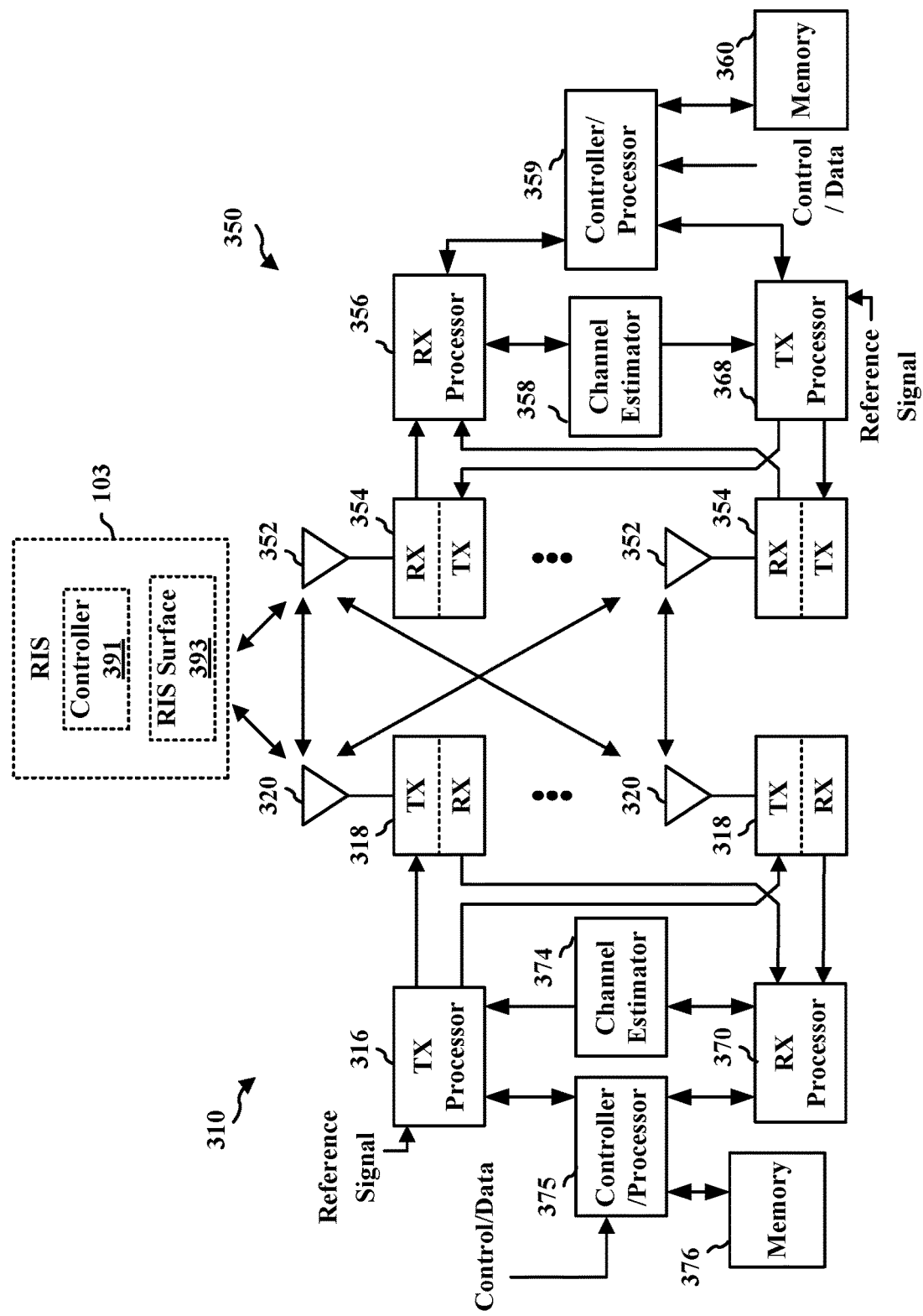
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. In some aspects, communication may be provided between the device 310 and the device 350 by an RIS 103, such as described in connection with any of FIG. 1 or FIGS. 4-16. The communication may be intelligently reflected, e.g., by an RIS surface 393 of the RIS 103. Discovery information, such as RIS capability information and/or position information for the RIS 103 may be transmitted by the controller 391, e.g., via sidelink or another type of link. The controller 391 may receive a configuration for activation and deactivation times, as described in the present application.

Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the SL ranging component 198 of FIG. 1. In another example, at least one of the TX processor 368, the RX processor 356, and the controller/processor 359 may be configured to perform aspects in connection with the RIS activation component 199 of FIG. 1.

Figure 4:
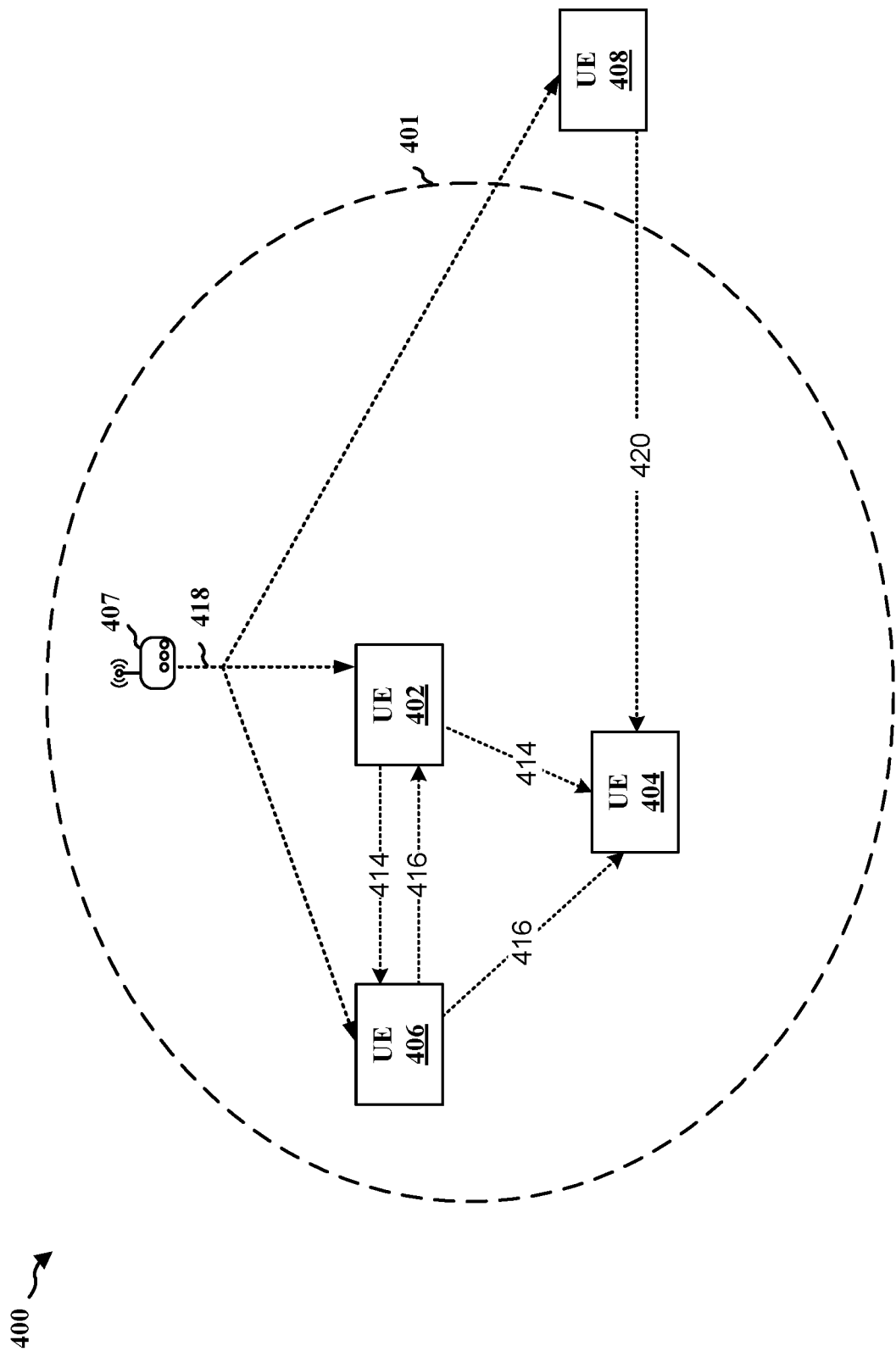
FIG. 4 is a diagram illustrating an example of wireless communication between devices based on sidelink communication in accordance with various aspects of the present disclosure.

FIG. 4 is a diagram 400 illustrating an example of wireless communication between devices based on sidelink communication. In one example, a UE 402 may transmit a transmission 414, e.g., including a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1" or "sidelink Mode 1"), centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180. In a second resource allocation mode (which may be referred to herein as "Mode 2" or "sidelink Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

A UE's position and/or a UE's range with respect to another UE may be determined/estimated based on sidelink (SL) communications. For example, two UEs may determine their locations (e.g., absolute locations) based on global navigation satellite system (GNSS), and the UEs may exchange their locations (e.g., their geographical longitude and latitude) with each other, such as via a V2X safety message. Thus, a UE may obtain, or otherwise determine, its location based on the GNSS and may broadcast, or otherwise transmit, information about its location in a sidelink message. As such, each of the surrounding UEs may be able to determine the location of the UE transmitting its location, and/or may determine a range between itself and the UE transmitting its location. If each of the UEs in the area transmit their respective location information, a UE may determine distances to the surrounding UEs relative to its location. In another example, UEs may determine their relative distance to another UE(s) and/or their absolute positions (e.g., geographical locations) based on reference signals transmitted and received between the UEs over sidelink, where such ranging or positioning technique may be referred to as an SL-based ranging or positioning. The distance between UEs may be monitored for various reasons. In some applications, such as V2X, the distance between UEs may be monitored as a part of avoiding collisions, improving road user safety, etc. The SL-based ranging or positioning may provide a UE with an alternative or additional ranging/positioning mechanism when positioning based on GNSS is attenuated or unavailable (e.g., when the UE is in a tunnel, an urban area, a canyon, or a sheltered place, etc.). For example, the SL-based ranging or positioning may be used by UEs for public safety use cases where network service and/or other positioning services are not available. In other examples, if the GNSS is available, the SL-based ranging or positioning may further be used by a positioning device in addition to a GNSS-based positioning to enhance the accuracy of the GNSS-based positioning.

In one example, an SL-based ranging or positioning for a UE may be accomplished based on a three-way handshake for a session establishment between the UE and one or more peer UEs, followed by exchanging of PRSs between the UE and the one or more peer UEs, and concluded by exchanging measurements based on PRS transmission and reception via messaging between the UE and the one or more peer UEs.

Figure 5:
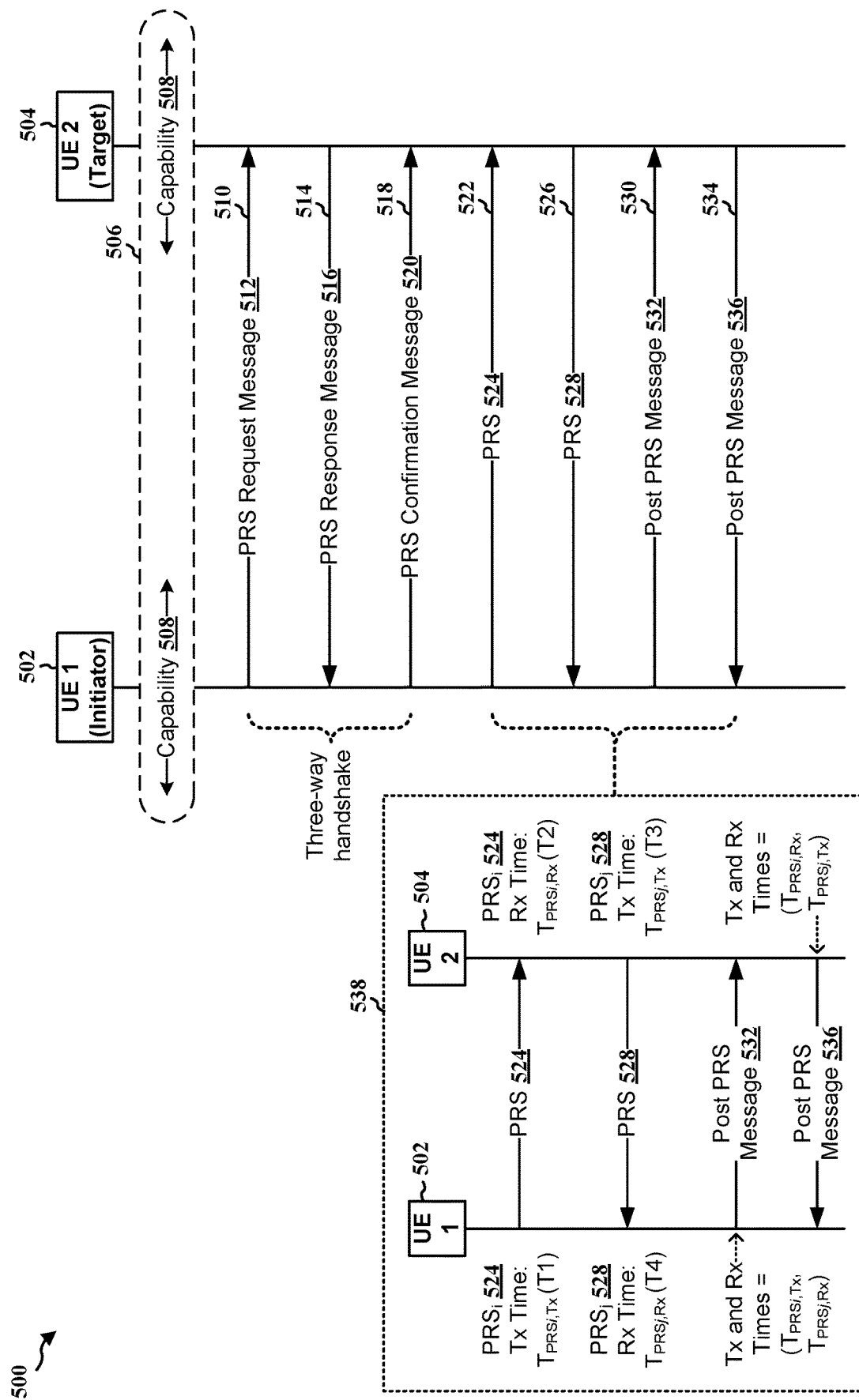
FIG. 5 is a communication flow illustrating an example of a sidelink (SL)-based ranging or positioning session between two UEs in accordance with various aspects of the present disclosure.

FIG. 5 is a communication flow 500 illustrating an example of an SL-based ranging or positioning session between two UEs in accordance with various aspects of the present disclosure. An SL ranging between a first UE 502 (e.g., an initiator) and a second UE 504 (e.g., a target) may be determined based at least in part on calculating an inter-UE round trip time (RTT) between positioning reference signals (PRSs) (e.g., wideband PRSs, SL PRSs, etc.) transmitted from the first UE 502 to the second UE 504 and the PRSs transmitted from the second UE 504 to the first UE 502. For example, based on the transmission (Tx) and reception (Rx) times of PRSs between the first UE 502 and the second UE 504, the first UE 502 and/or the second UE 504 may be able to determine the RTT between the transmitted PRSs and the received PRSs. Then, based on the RTT, the first UE 502 and/or the second UE 504 may determine a distance between the first UE 502 and the second UE 504.

In one example, as shown at 506, the first UE 502 and/or the second UE 504 may exchange a capability message 508 with each other, where the capability message 508 from the first UE 502 and/or the second UE 504 may include information related to each UE's capability to perform an SL-ranging/positioning. Based at least in part on the exchanged capability messages 508, the first UE 502 may determine whether the second UE 504 is a candidate for performing the SL-ranging/positioning.

After the capability message 508 exchanging, the first UE 502 may initiate an SL-ranging/positioning session with the second UE 504 by establishing a three (3)-way handshake with the second UE 504. For example, at 510, the first UE 502 may transmit a PRS request message 512 (e.g., PRS-request) to the second UE 504 for requesting the second UE 504 to transmit one or more PRSs to the first UE 502. At 514, in response to the PRS request message 512, the second UE 504 may transmit a PRS response message 516 to the first UE 502. For example, the PRS response message 516 may indicate whether the second UE 504 is able to grant the first UE 502's PRS request (e.g., the request for exchanging PRS). At 518, in response to the PRS response message 516, the first UE 502 may transmit a PRS confirmation message 520 to the second UE 504. For example, the PRS confirmation message 520 may confirm the PRS transmissions between the first UE 502 and the second UE 504. In other words, the three-way handshake initiated by the first UE 502 may include transmissions of the PRS request message 512, reception of the PRS response message 516, and transmission of the PRS confirmation message 520 at the first UE 502.

At 522, after the three-way handshake, the first UE 502 may transmit one or more PRSs 524 to the second UE 504. At 526, in response to the one or more PRSs 524, the second UE 504 may transmit one or more PRSs 528 to the first UE 502.

At 530, after receiving the one or more PRSs 526 from the second UE 504, the first UE 502 may measure the received one or more PRSs 526, such as the time in which the one or more PRSs 526 are received, and the first UE 502 may transmit information related to the measurement to the second UE 504 via a post PRS message 532. Similarly, at 534, the second UE 504 may measure the one or more PRSs 528, and the second UE 504 may transmit information related to the measurement to the first UE 502 via a post PRS message 536.

Based on a local measurement for the transmitted and the received PRSs (e.g., PRSs 524 and 528) and based on the measurement received from the other UE in the post PRS message (e.g., 532 or 536), the first UE 502 and/or the second UE 504 may be able to determine an RTT for the transmitted and the received PRSs.

In one example, as shown at 538, the first UE 502 and/or the second UE 504 may include two timestamps for the Tx time and the Rx time of the PRSs transmitted and received in its respective post PRS message. Then, the first UE 502 and/or the second UE 504 may determine the RTT for the PRSs transmitted and received based on the two timestamps received from the other UE. For example, the first UE 502 may include a transmission time for the one or more PRSs 524 (e.g., $T_{PRS_i, Tx}$, T1) and a reception time for the one or more PRSs 528 (e.g., $T_{PRS_{j,Rx}}$, T4) in the post PRS message 532, and the second UE 504 may include a reception time for the one or more PRSs 524 (e.g., $T_{PRS_{i,Rx}}$, T2) and a transmission time for the one or more PRSs 528 (e.g., $T_{PRS_{i,Tx}}$, T3) in the post PRS message 536. In other words, each UE may transmit its PRS Tx time and the Rx time for the PRS received from the peer UE in its post PRS message. Then, the RTT from the first UE 502 to the second UE 504 may be calculated by subtracting the respective Rx-Tx times of the PRSs for the first UE 502 and the second UE 504. For example, the RTT may be calculated based on the following equations:

$$RTT = (T_{PRS_{i,Rx}} - T_{PRS_{i,Tx}}) + (T_{PRS_{j,Rx}} - T_{PRS_{j,Tx}}),$$

$$RTT = \left(\begin{array}{c}PRS_i \text{ one way} \\ \text{time of flight}\end{array}\right) + \left(\begin{array}{c}PRS_j \text{ one way} \\ \text{time of flight}\end{array}\right).$$

Then, a distance between the first UE 502 and the second UE 504 may be computed based on the calculated RTT. The SL-based ranging or positioning described herein may apply to two vehicle UEs (e.g., for calculating/estimating a distance between two vehicles), to a vehicle UE and a pedestrian UE (e.g., for calculating/estimating a distance a vehicle and a pedestrian), and/or to two mobile phones in general sidelink use cases (e.g., for calculating/estimating a distance between two mobile phone users), etc.

Figure 6:
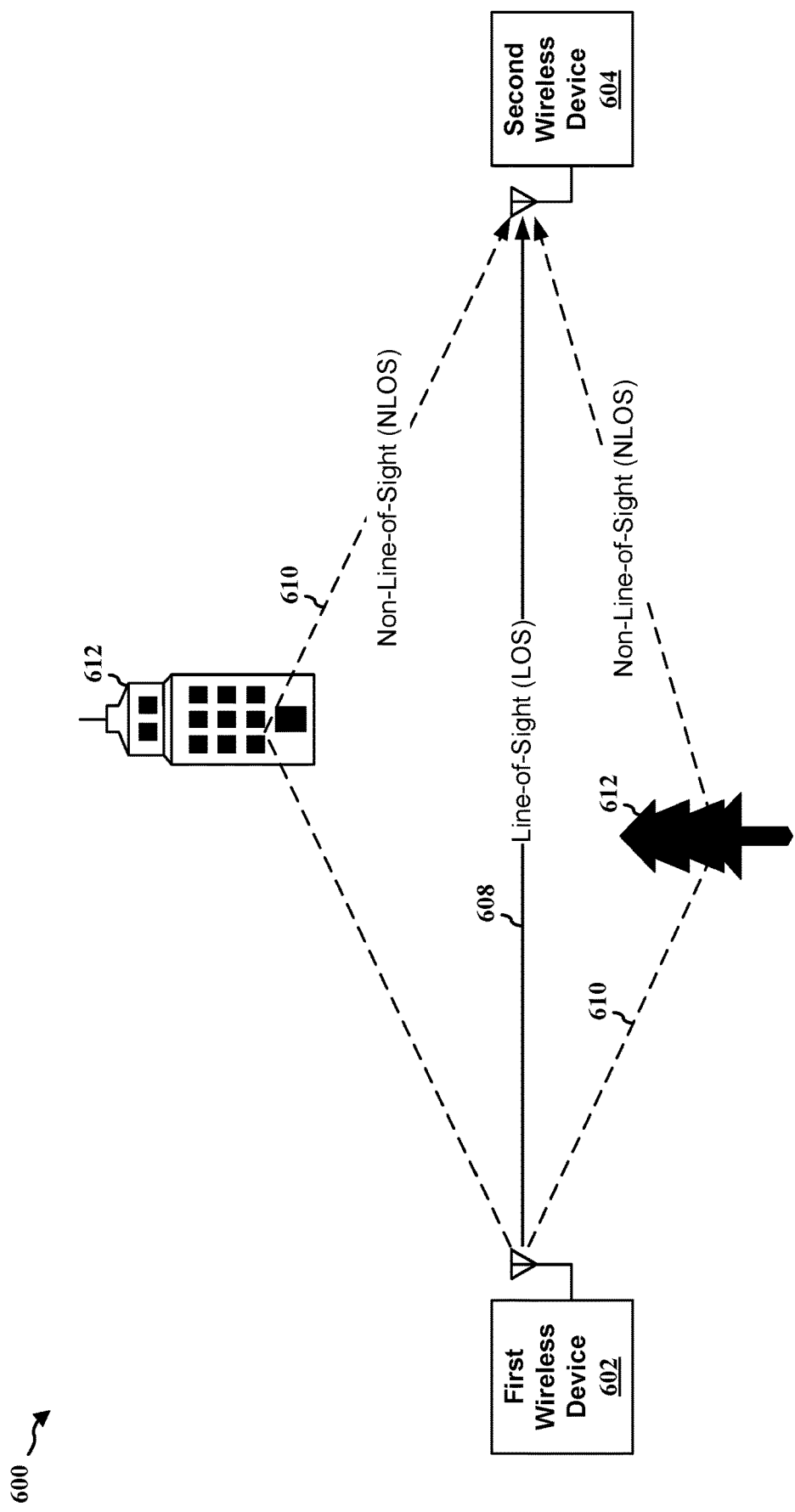
FIG. 6 is a diagram illustrating an example communication between wireless devices involving line-of-sight (LOS) and non-line-of-sight (NLOS) channels in accordance with various aspects of the present disclosure.

The accuracy of an SL-based ranging or positioning may be affected by whether UEs are in a line-of-sight (LOS) condition or in a non-line-of-sight (NLOS) condition with each other. FIG. 6 is a diagram 600 illustrating an example communication between wireless devices involving LOS and NLOS channels in accordance with various aspects of the present disclosure. A first wireless device 602 (e.g., a UE, a positioning reference device, a sidelink device, a base station, etc.) may be configured or scheduled to transmit data to a second wireless device 604 (e.g., a UE, a positioning reference device, a sidelink device, a base station, etc.). In some scenarios, as shown at 608, the data transmitted from the first wireless device 602 may reach the second wireless device 604 directly without being obstructed by obstacle(s). In other scenarios, as shown at 610, the data transmitted from first wireless device 602 may reach the second wireless device 604 indirectly via reflection, refraction, and/or penetration, etc. (e.g., one or more objects 612 may obstruct or may be within the transmission path of the data). As a signal traveling through an NLOS path/channel such as shown at 610 may reach the second wireless device 604 later and/or with a weaker power compared to a signal traveling through an LOS path/channel such as shown at 608 (e.g., a path/channel without obstructions), the RTT for signals travelling via an NLOS path/channel may also be longer. As such, a calculation or an estimation of a distance between the first wireless device 602 and the second wireless device 604 based on the RTT may not be accurate.

For purposes of the present disclosure, a signal/data transmission without being obstructed by obstacle(s) may be referred to as a "LOS transmission," a "LOS signal/data," a "signal/data transmitted via an LOS path/channel," etc., whereas a signal/data transmission that is obstructed by obstacle(s) may be referred to as an "NLOS transmission," an "NLOS signal/data," a "signal/data transmitted via an NLOS path/channel," etc., (e.g., signal/data transmission involving reflection, refraction, and/or penetration, etc.). Signal reflection may be referring to a signal transmitted from a transmitter (e.g., the first wireless device 602) in a signal/beam path that is bounced off from one or more objects (e.g., the objects 612) before reaching a receiver (e.g., the second wireless device 604). Signal refraction may refer to a signal that is transmitted from a transmitter in a signal/beam path and changes its direction as it passes through an obstacle (e.g., a material or a medium in which the signal is able to pass/penetrate through) before reaching a receiver. Signal penetration may refer to a signal that is transmitted from a transmitter in a signal/beam path and penetrates an object or medium before reaching a receiver.

Figure 7:
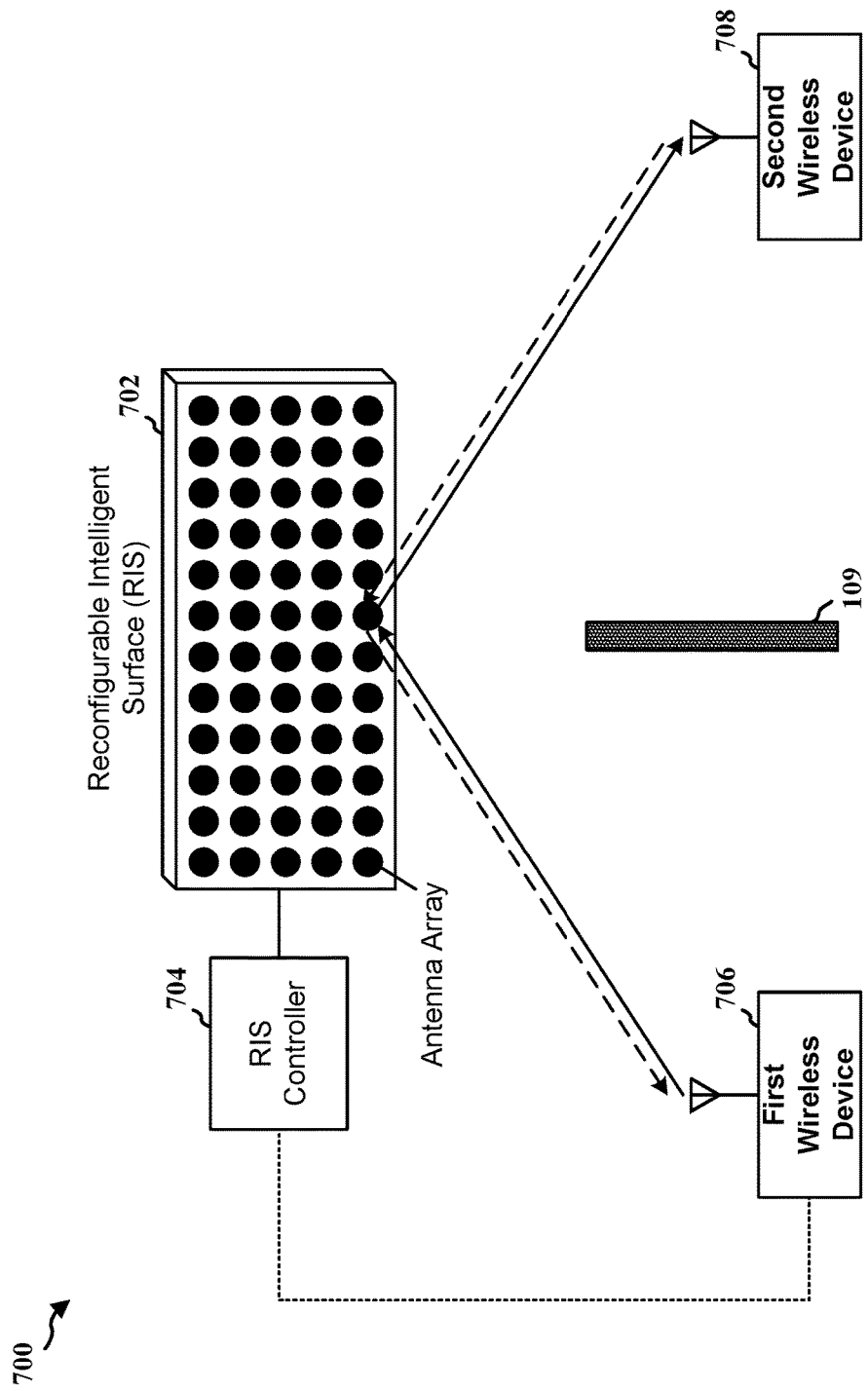
FIG. 7 is a diagram illustrating an example reconfigurable intelligent surface (RIS) in accordance with various aspects of the present disclosure.

To improve communication between wireless devices that are in an NLOS condition (or not in an LOS condition), a reconfigurable intelligent surface (RIS) (which may also be referred to as a "reflection intelligent surface") may be used by the wireless devices to assist their transmission/reception (or relaying) of signals. FIG. 7 is a diagram 700 illustrating an example reconfigurable intelligent surface in accordance with various aspects of the present disclosure. As shown at 702, an RIS may be a planar structure that is engineered/configured to have properties that enable a dynamic control of the electromagnetic waves. A RIS may be a low power passive device or node that is capable of receiving a signal from a first wireless device (e.g., a transmitter) and then re-radiating or reflecting the signal to a second wireless device (e.g., a receiver) with controllable time-delays. An RIS may include a phased array without a transceiver, and an RIS may be designed based on an antenna or a metamaterial, where the RIS may be configured to reflect or re-radiate a signal to one or more directions. For example, a phase shifting control may be integrated with an antenna panel to control the phase shifting of the antenna panel. An RIS may include multiple small elements that are associated with different time-delays and thereby the RIS may be capable of synthesizing a scattering behavior of an arbitrarily-shaped object of the same size. This feature may, for instance, be used to beamform a signal towards a receiving wireless device.

In some examples, as shown at 704, an RIS may include an RIS controller and one or more antenna arrays, where the RIS controller may control the one or more antenna arrays to receive/reflect signal towards one or more directions. The RIS controller may be able to communicate with other nodes, e.g., a UE, a base station, an RSU, etc. For example, in a cellular network, a network node (e.g., a base station or RSU) may control an RIS, where the network node may determine/configure one or more parameters for the RIS, such as an activation/deactivation time, a phase, beam direction(s), and/or beamforming weights used by the RIS, etc. The base station or RSU may indicate the determined/configured parameters to one or more UEs, and a UE may use the RIS to assist its transmission and/or reception of signal with other UE(s) based at least in part on the determined/configured parameters. A communication link between the base station and the RIS may be wired or wireless.

As an RIS may be capable of reflecting or re-radiating signals to a different direction, the RIS may be used by wireless devices to turn an NLOS path/channel to a path/channel that is close or similar to an LOS path/channel by reflecting/relaying signals transmitted between wireless devices. As such, wireless devices may use an RIS to improve their communication when the wireless devices are not in an LOS condition (e.g., the wireless devices are in an NLOS condition), where one wireless device may transmit signals to another wireless device via the RIS. The RIS may also be used by wireless devices to improve network coverage/throughput, and to reduce power consumption. For example, an RIS may be configured to reflect signals transmitted from a transmitting device toward a direction or an area that is not covered by the signals (e.g., a coverage hole, etc.) with less power compared to increasing the transmission power of the transmitting device.

FIG. 8A illustrates example aspects of signal reflection 800 by an RIS 802. In FIG. 8A, the RIS receives the incident wave 804, e.g., the signal from the transmitter, at an angle $\theta_i$ relative to a reference that is perpendicular to the reflective surface of the RIS and transmits the received wave as a reflected wave 806 at an angle $\theta_r$. The controller 808 of the RIS may control the angle $\theta_r$ at which the reflected wave is steered toward the intended receiver, such as described in connection with the RIS controller 704 or the controller 391.

The RIS may be used to change a channel environment. FIGS. 8B and 8C shows example scenarios 825 and 850, respectively that show wireless communication from a transmitting device 810 to a receiving device 812 without an RIS 802 in FIG. 8B and with an RIS 802 in FIG. 8C. In FIG. 8C, the channel between the transmitting device 810 and the receiving device 812 is different due to the reflected path from the RIS 802 to the receiving device 812. The transmitting device 810, or another controlling device, may provide control signaling 816 to the controller 808 of the RIS. In some aspects, a channel response, or channel environment, may be controlled by switching one or more RIS on and off, e.g., to change between the scenarios in FIGS. 8B and 8C. Although a single RIS 802 is illustrated in FIGS. 8A-8C, there may be multiple RISs present in the environment. The channel may be adjusted by switching one or more of the RISs on or off together with adapting the analog beamforming weights of the RIS(s).

As described in connection with FIGS. 5 and 6, sidelink based ranging may include having two or more UEs transmit a PRS to obtain their range or position. There may be a LOS path or may be a NLOS path between the UEs. A NLOS path may introduce changes, or errors, in the range measurements obtained based on the PRS. Sidelink ranging may be used for safety applications, such as where GNSS or network based positioning services are not available.

In the example illustrated in FIG. 7, the first wireless device 706 may intend to perform a ranging procedure with the second wireless device 708, and there may be a blockage 109 between the devices. In this example, the blockage 109 may block the PRS between the devices, and the first wireless device 706 may be unable to obtain a LOS with the second wireless device 708. If the LOS is not available or is not inferred correctly, the first wireless device 706 may determine a range between the first and second wireless device using the RIS 702.

Aspects presented herein may improve the efficiency and performance of an SL-based ranging or positioning in which at least one RIS may be utilized by one or more wireless devices for relaying reference signals (e.g., SL PRSs) to improve the accuracy of an SL-based ranging or positioning. Aspects presented herein provide signaling and procedures for a UE to obtain an improved range measurement between UEs when multiple RISs are present and their locations are unknown or when the UEs operate based on a mode 2, decentralized, resource allocation for sidelink transmissions. Aspects presented herein provide for the UE to determine the UE's location based on RIS(s) having known locations.

Figure 9:
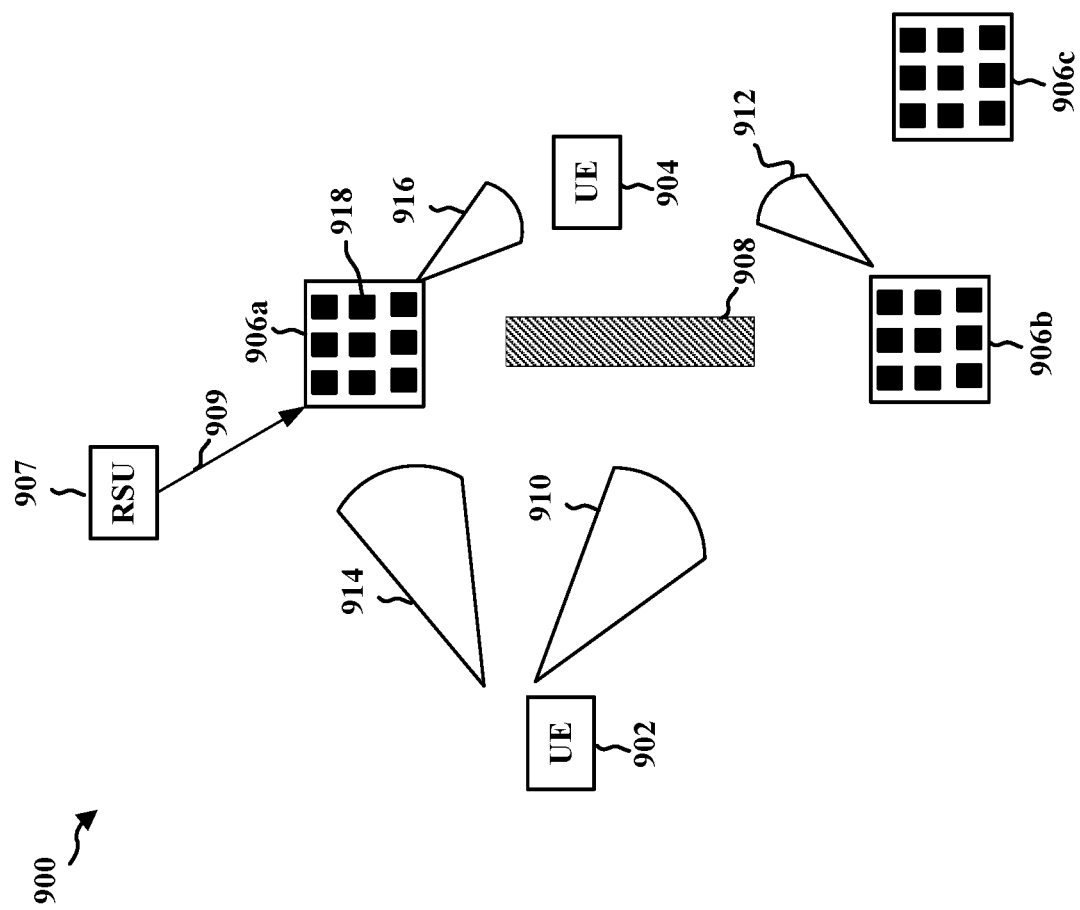
FIG. 9 illustrates a diagram showing sidelink communication between UEs with multiple RISs.

FIG. 9 illustrates an example diagram 900 in which a first UE 902 may perform ranging with a second UE 904 or positioning through the use of one or more RIS 906a, 906b, 906c. As an example, the first UE 902 and the second UE 904 may perform ranging via the RISs 906a-c due to a blockage 908 that blocks a LOS path between the first UE 902 and the second UE 904.

In some examples, one RIS at a particular location, of the multiple RISs 906a-c, may be switched on, or activated, at a particular time. The timing of the activation may be configured. In some aspects, an RSU 907 may control the switching ON/OFF, e.g., the activation and deactivation, of the RISs 906a-c via a signal 909. In some aspects, another controlling device, such as a base station or other controlling device may control the activation/deactivation of the RISs 906a-c. In some aspects, the RIS ON/OFF patterns, which may be referred to as activation and deactivation patterns, may be configured based on a geographical zone. A UE 902 or 904 may be aware of the time to transmit or receive a PRS based on the zone/location in which the UE and/or RIS is located. For example, the UE 902 may transmit a PRS at times based on the activation/deactivation pattern of one or more of the RISs 906a-c.

In some aspects, the locations of the RIS 906a-c may be known to the UE. Each UE, e.g., the UE 902 and 904, may transmit a PRS during the times when RIS at different locations are ON, and may measure the RTT with each of the RIS to determine its own location. As an example, the UE 902 may transmit a PRS 914 when the RIS 906a is activated, and may transmit the PRS 910 at a different time when the RIS 906b is activated. The UE 904 may receive the PRS 914 as a reflected signal 916 from the RIS 906a based on the activation time of the RIS 906a, and may receive the PRS 910 as a reflected signal 912 from the RIS 906b based on the activation time of the RIS 906b. Each RIS 906a-906c may include multiple elements 918, a subset of which may be used to provide a reflected signal (e.g., 916 or 912) in a particular direction. Similarly, the UE 902 may transmit a PRS at a time based on the activation time of the RIS 906c. Although three RISs are illustrated as reflecting the signal, the concept may be applied with any number of one or more RISs.

In some aspects, the locations of RIS may not be known by the UE. The UE 902 can obtain a better bound on the range between the UE 902 and another UE 904 by transmitting a PRS during a time when none of the RIS 906a-c is switched on, e.g., activated, and may transmit the PRS during one or more additional time instants when the RIS 906a-c at different locations are active. The channels during each of the above time instants may be measured to infer the time difference of arrival (TDOA) or round trip time (RTT). The UE 902 may infer, or otherwise determine, the range between the UE 902 and the UE 904 based on the minimum of TDOA/RTT of the RIS measurements. In some aspects, the set of RIS to be used for the ranging or positioning may be based on the relative locations of the UEs that will perform the ranging.

Figure 10:
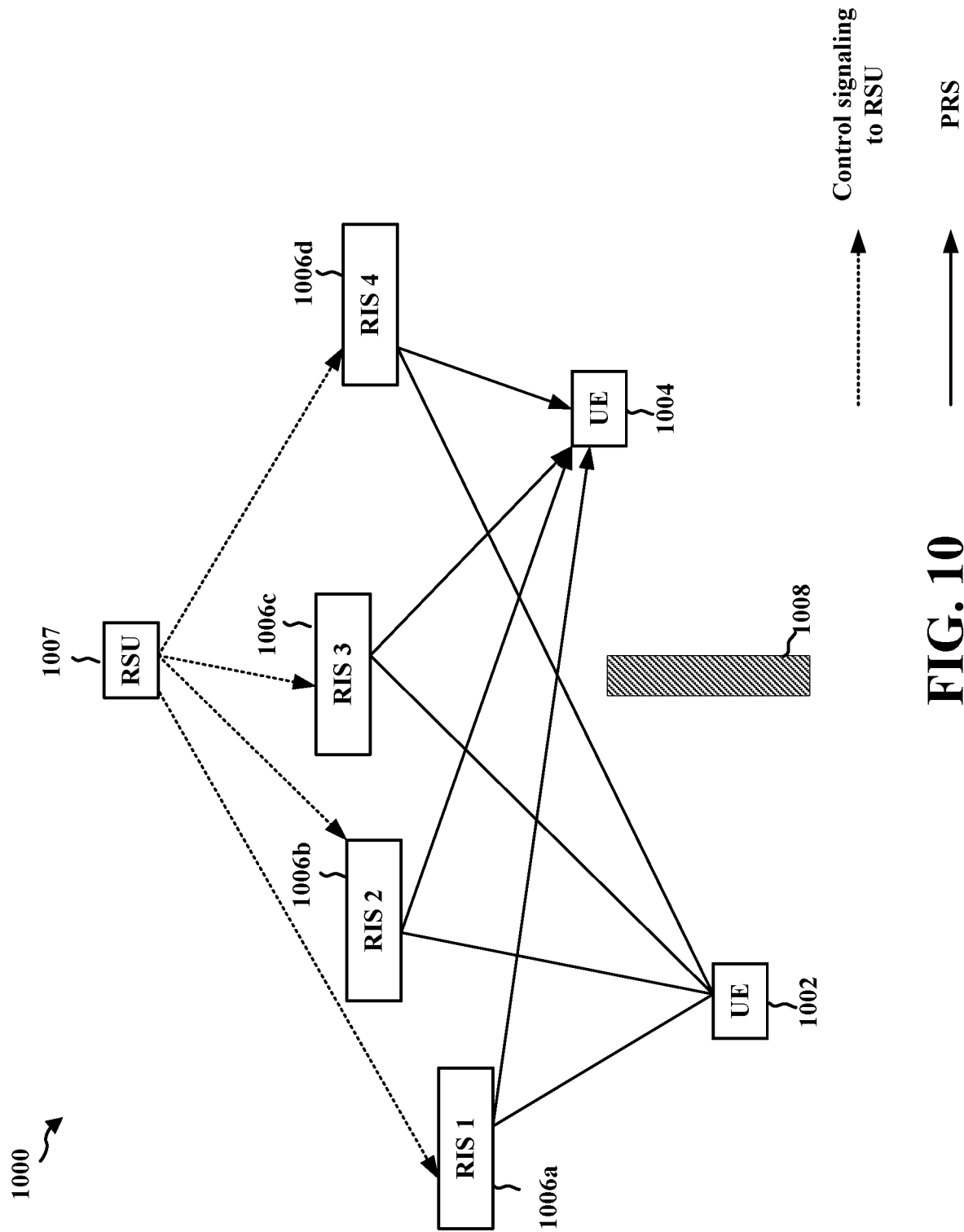
FIG. 10 illustrates a diagram showing aspects of sidelink ranging between UEs with multiple RISs.

FIG. 10 illustrates a diagram 1000 for a multiple RIS based range estimation, such as when the RIS locations are known. In FIG. 10, multiple RISs 1006a, 1006b, 1006c, and 1006d are positioned at different locations. The UEs 1002 and 1004 may be aware of the locations of the RISs 1006a-d. The RISs 1006a-d may be activated, or enabled, at different times, e.g., being activated one at a time in a particular order. The order and timing may be configured for each of the RISs 1006a-d. In some aspects, an RSU 1007 may configure each of the RISs 1006a-d to activate at a particular time and to deactivate at other times. The time during which an RIS is activated may be referred to herein as a time instance, a time occasion, a period of time, an activation time, an ON time, etc. The UEs 1002 and 1004 may be aware of the time instances when the different RIS will be active. In some aspects, the UE may determine the activation time based on a zone, such as a zone in which the particular RIS is located. In some aspects, the UE may be informed of the activation time, such as in signaling from the RSU 1007, a base station, etc.

The UEs 1002 and 1004 may transmit a PRS, to perform a TDOA/RTT measurement, during the time occasions that a subset of MS, with which the UE will perform the measurements, will be active. The subset of RIS may include one or more of the multiple RISs The UEs may determine the range between the UEs, e.g., between the UE 1002 and 1004, based on multiple TDOA/RTT measurements with different RISs 1006*a-d*. For example, the UEs may determine the range based on a minimum TDOA/RTT measurement with different RISs 1006*a-d*.

In some aspects, a UE that initiates the ranging procedure, which may be referred to as the range initiator, and intends to perform ranging measurements with another UE may provide the time instances at which the measurements are to be performed. The range initiator UE may be aware of the subset of RISs that are enabled at different instances, and each of the time instances indicated by the UE may correspond to times when an RIS at a particular location is active.

Figure 11:
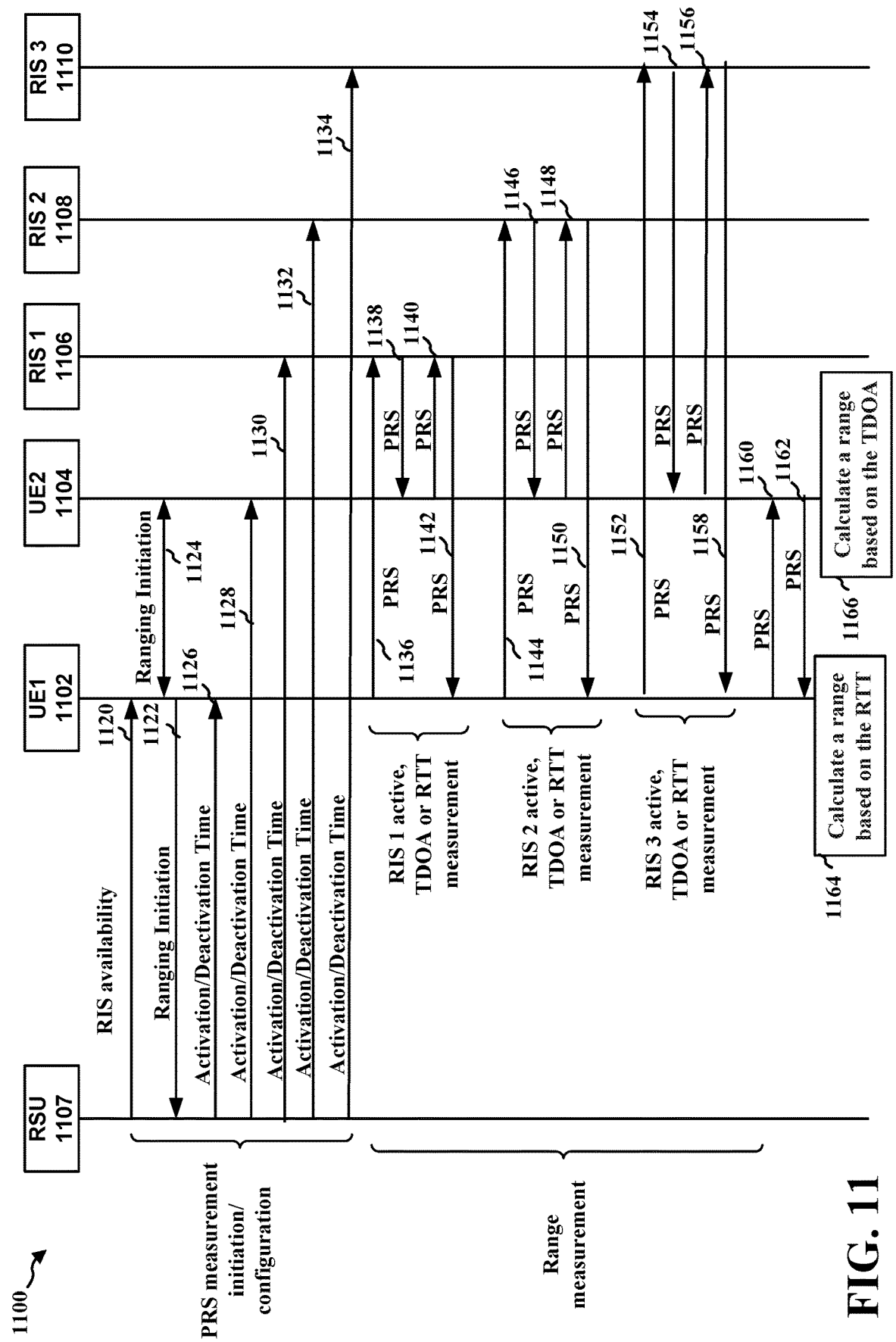
FIG. 11 is an example communication flow illustrating an example of two UEs performing an SL ranging with assistance of multiple RISs.

FIG. 11 illustrates a communication flow 1100 including ranging with multiple RISs. The UE 1102 may be the initiator UE, and may initiate a ranging procedure. The UE 1102 may indicate the initiation of the ranging procedure to the RSU 1107, at 1122. The UE 1102 may initiate the ranging procedure with the UE 1104, at 1124. The initiation may include any of the aspects described in connection with FIG. 5, for example.

In some aspects, different sets of RIS may be formed, and one or more RIS in the set may be active at a particular time based on the geography, location, or zone of the MS set or particular RISs within the set. In some aspects, the set of RISs may be pseudorandom. As an example, an RISx at zone 1 may be enabled at time occasion 1, and RISy at zone 2 may be enabled at time occasion 2. The timing information may be indicated to the UE or may be otherwise known at the UE. In some aspects, some of the time occasions may correspond to a set of RISs being active. As an example, time occasion 1 (t1), time occasion 3 (t3), and time occasion 5 (t5), e.g., {t1, t3, t5} may correspond to activation of {RIS 1, RIS 2, RIS 4}, in FIG. 10.

In some aspects, the time instances for performing the PRS measurements may be provided to the initiator UE. As an example, FIG. 11 illustrates that the RSU 1107 may indicate the RIS availability to the UE 1102 at 1120. As another example, in FIG. 10, the RSU 1007 may indicate the time instances to one or more of the UEs. In some aspects, the RSU 1007 or 1107 may choose a set of one or more RIS based on the relative location of the first UE and the second UE, e.g., the UEs 1002 and 1004 or the UEs 1102 and 1104. For example, the RSU 1007 or 1107 may select a set of RISs, e.g., RIS 1106, 1108, and 1110 at different locations that are not in a straight line in order to provide signal diversity for the ranging/positioning procedure. The different locations of the RISs may in turn correspond to different time instances when the RISs at different locations will be active.

As an example, the RSU 1107 may enable $n_1$ number of RISs, one at a time based on a first relative position between the UE 1102 and the UE 1104 and the number of blockages, such as blockage 1008 in FIG. 10, between the UEs. In some aspects, the RSU 1107 may be aware of the blockages based on a map or other information. As another example, the RSU 1107 may enable $n_2$ number of RISs, one at a time, based on a second relative positioning between the UE 1102 and the UE 1104 and the number of blockages 1008 between the UEs. The RSU 1107 may provide the initiator UE (e.g. the UE 1102), with the $n_1$ or $n_2$ time instances for measurement.

In some aspects, the number of RIS and the time instances during which a particular RIS is to be enabled/activated may configured, or otherwise indicated, by the initiator UE, e.g., the UE 1102. For example, the UE 1102 may receive an indication of, or may determine based on known information, different subsets of RIS that can be enabled. The RSU 1107 may provide the information to the UE 1102, such as at 1120. As an example, a first set of RIS may correspond to S1={RIS1, RIS3, RIS4}, and a second set of RISs may correspond to S2={RIS4, RIS1, RIS5}. The RIS sets S1 and S2 may correspond to different RIS options/time occasions. For example, set S1 may be enabled/activated at time instances {t1, t3, t4}, while set S2 may be enabled/activated at time instances {t2, t6, t8}. The UE 1102 may set up a ranging session with the UE 1104 at 1124, e.g., such as described in connection with any of the aspects of FIG. 5. The setup 1124 may include the configuration of the time instances/set of one or more RIS. The UE 1102 may indicate a set of RISs, e.g., S1 or S2, to the RSU 1107 at 1122 to enable/activate the RISs at the corresponding time instances.

The RSU 1107 may indicate, or configure, the activation time and/or deactivation time for the different RISs 1106, 1108, and 1110, as shown at 1130, 1132, and 1134.

In some aspects, the RSU 1107 may configure the activation/deactivation times without an indication from the UE 1102. The RSU 1107 may indicate the activation/deactivation time(s) to the UE 1102 at 1126 and/or to the UE 1104 at 1128.

Based on the different RIS being enabled/activated at the time instances, the UE 1102 and UE 1104 transmit PRS and perform measurements.

In some aspects, the UE 1104 may perform a TDOA measurement with the UE 1102. The UE 1102 transmits a PRS 1136, at a time that the RIS 1106 is activated. The PRS 1136 is reflected by the RIS 1106 to the UE 1104, as PRS 1138. The reflection may include any of the aspects described in connection with FIGS. 7-10. The UE 1104 transmits a PRS, PRS measurement, or other PRS message, at 1140, which is reflected by the RIS 1106 at 1142. The UE 1102 transmits a PRS 1144, at a time that the RIS 1108 is activated. The PRS 1144 is reflected by the RIS 1108 to the UE 1104, as PRS 1146. The UE 1104 transmits a PRS, PRS measurement, or other PRS message, at 1148, which is reflected by the RIS 1108 at 1150. The UE 1102 transmits a PRS 1152, at a time that the RIS 1110 is activated. The PRS 1152 is reflected by the RIS 1110 to the UE 1104, as PRS 1154. The UE 1104 transmits a PRS, PRS measurement, or other PRS message, at 1156, which is reflected by the RIS 1110 at 1158.

The UE 1102 may transmit the PRS 1136, 1144, 1152 at times {t1, t3, t6} based on the activation times of the RISs 1106, 1108, and 1110. The UE 1104 measures the TDOA of the transmitted PRS at the time occasions {t1, t3, t6}. The UE 1104 determines the range between the UE 1102 and the UE 1104 based on the measurements, at 1166. For example, the UE 1102 may determine the range between the UE 1102 and the UE 1104 based on a minimum TDOA of the measurements. In some aspects, the UE 1102 may transmit a PRS 1160 at a time when none of the RIS 1106, 1108, or 1110 is activated. The UE 1104 may return a PRS transmission 1162. The UE 1104 may include the TDOA measurement of the PRS transmission 1160 in the range determination.

The UE 1102 may perform RTT measurements with the UE 1104, at 1164, by measuring the PRS 1142, 1150, and 1158 from the UE 1104. For example, if the UE 1102 transmits the PRS at times {t, t1, t3, t6}, the UE 1104 may transmit the PRS 1140, 1148, and 1156 at times {t+d, t1+d, t3+d, t6+d}. In this example, t may represent the time when none of the RISs are activated, and d may be a configured delay between reception and transmission for the UE 1104. The UE 1102 may determine the range between the UE 1102 and 1104 based on the RTT measurements, at 1164. For example, the UE 1102 may determine the range based on a minimum of the RTT measurements.

The multiple RIS based determination of the range may be performed when the RIS locations of the RIS 1106, 1108, and 1110 are not known by the UE 1102 and 1104.

Figure 12:
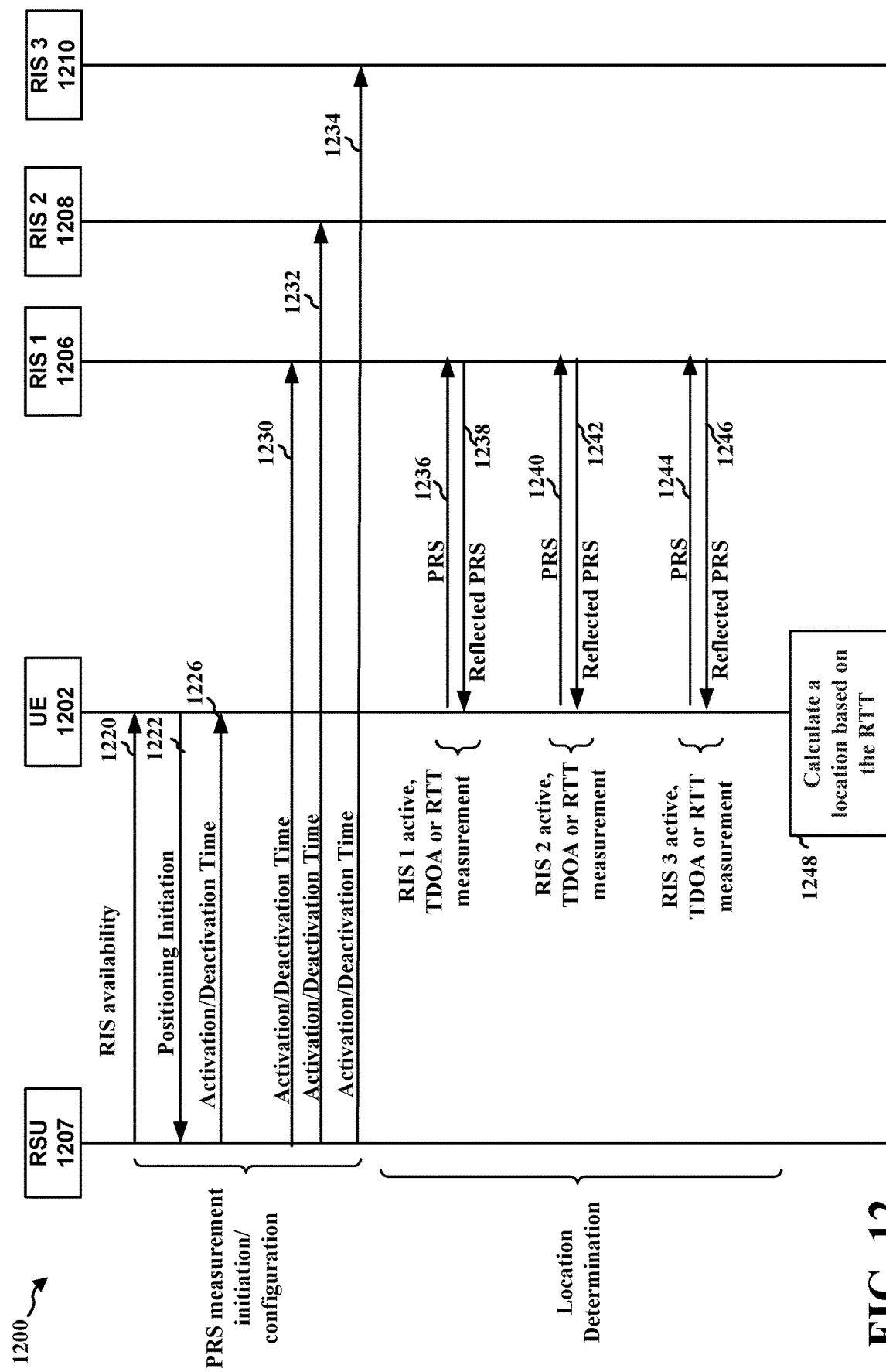
FIG. 12 is an example communication flow illustrating an example of a UE obtaining its location based on ranging with multiple RISs.

In some aspects, a UE may know the location of the RISs and may use the location of the RISs to determine the UE's location. The determination of the location may be referred to as positioning. FIG. 12 illustrates a diagram 1200 of a positioning procedure performed with multiple RISs 1206, 1208, and 1210. The UE 1202 may perform a multiple RIS based location determination, such as positioning, using the known RIS locations. As described in connection with FIG. 12, different RIS, e.g., the RIS 1206, 1208, and 1210, may be enabled at different times, e.g., one RIS being activated at a time. In some aspects, the RSU 1207 enables or activates a set of RIS (e.g., the RISs 1206, 1208, and 1210) and configures or controls the times when the RISs are switched on/off, as shown at 1230, 1232, and 1234. In some aspects, the RSU 1207 may activate/deactivate the RISs 1206, 1208, 1210 based on the relative locations of the RIS and the UE 1202 that will perform the location determination. The RSU 1207 may indicate the RIS availability at 1220 and may provide information about any of location, activation timing, etc. In some aspects, the UE 1202 may indicate that the UE 1202 will perform a location determination/positioning procedure, at 1222. The RSU may respond with the activation/deactivation time information, at 1226. In some aspects, the UE 1202 may indicate a time or a set of RISs to be activate, such as described in connection with FIG. 11.

During each of the time occasions when one of the RISs is enabled, the UE 1202 transmits a PRS and receives the reflection of the PRS from the RIS. For example, the UE 1202 may transmit the PRS and receive the PRS concurrently, or overlapping at least partially in time, such as if the UE is operating in full-duplex mode. The UE 1202 may determine a range between the corresponding RIS and the UE 1202 based on the measurement. For example, at the time that the RIS 1206 is activated, the UE 1202 transmits the PRS 1236 and receives the reflection of the PRS 1238 provided by the RIS 1206. The UE measures an RTT based on the received reflection of the PRS in order to determine a range or position relative to the RIS 1206. Similarly, at the time that the RIS 1208 is activated, the UE 1202 transmits the PRS 1240 and receives the reflection of the PRS 1242 provided by the RIS 1208. The UE 1202 measures an RTT based on the received reflection of the PRS in order to determine a range or position relative to the RIS 1208. Similarly, at the time that the RIS 1210 is activated, the UE 1202 transmits the PRS 1244 and receives the reflection of the PRS 1246 provided by the RIS 1210. The UE 1202 measures an RTT based on the received reflection of the PRS in order to determine a range or position relative to the RIS 1210.

The UE 1202 performs the measurements with different RISs and obtains a range measurement from the different RISs, or different sets of RISs, at different locations to obtain an absolute location of the UE. The UE uses the range and the known location of the RISs to determine its own location, at 1248.

FIG. 13A is a flowchart 1300 of a method of wireless communication. The method may be performed by a UE (e.g., the UE 104, 502, 902, 1002, 1102, 1202; the device 350; the first wireless device 602, 706; or the apparatus 1402, which may include a processing system, which may include the memory, at least one processor, a transceiver, and/or at least one antenna). The method may enable the UE to perform a sidelink ranging or location determination with multiple RISs.

At 1304, the UE initiates a ranging operation. FIG. 5 illustrates an example ranging operation, and aspects of a ranging operation based on multiple RISs are described in connection with FIGS. 9-12. For example, the UE may initiate the ranging operation to determine a range between the UE and a second UE, e.g., as described in connection with FIG. 11. In some aspects, the UE may perform the procedure to determine a location of the UE, e.g., as described in connection with FIG. 12. The initiation may be performed, e.g., by the initiation component 1440 of the apparatus 1402 in FIG. 14.

At 1308, the UE transmits a reference signal at multiple time instances based on an activation time for at least one RIS. The reference signal may be a PRS. For example, the at least one RIS may include a first RIS and a second MS, and transmitting the reference signal based on the activation time for the at least one RIS may include transmitting the reference signal at a first time when the first RIS is activated and transmitting the reference signal at a second time when the second RIS is activated. The transmission may be performed, e.g., by the PRS component 1442 via the transmission component 1434 and/or RF transceiver 1422 of the apparatus 1402 in FIG. 14.

FIG. 13B illustrates a flowchart 1350 of a method of wireless communication. The method may be performed by a UE (e.g., the UE 104, 502, 902, 1002, 1102, 1202; the device 350; the first wireless device 602, 706; or the apparatus 1402, which may include a processing system, which may include the memory, at least one processor, a transceiver, and/or at least one antenna). Aspects that are described in connection with the flowchart 1300 in FIG. 13A are shown with the same reference number.

At 1304, the UE initiates a ranging operation. FIG. 5 illustrates an example ranging operation, and aspects of a ranging operation based on multiple RISs are described in connection with FIGS. 9-12. For example, the UE may initiate the ranging operation to determine a range between the UE and a second UE, e.g., as described in connection with FIG. 11. In some aspects, the UE may perform the procedure to determine a location of the UE, e.g., as described in connection with FIG. 12. The initiation may be performed, e.g., by the initiation component 1440 of the apparatus 1402 in FIG. 14.

At 1308, the UE transmits a reference signal at multiple time instances based on an activation time for at least one RIS. The reference signal may be a PRS. For example, the at least one RIS may include a first RIS and a second MS, and transmitting the reference signal based on the activation time for the at least one RIS may include transmitting the reference signal at a first time when the first RIS is activated, at 1314, and transmitting the reference signal at a second time when the second RIS is activated, at 1316. The transmission may be performed, e.g., by the PRS component 1442 via the transmission component 1434 and/or RF transceiver 1422 of the apparatus 1402 in FIG. 14.

In some aspects, the activation time for each of the at least one RIS is based on a zone in which a respective RIS is located.

In some aspects, the UE may be a first UE and may perform ranging measurements with a second UE based on the reference signal, at 1312. FIG. 11 illustrates an example of a UE 1102 performing ranging measurements with a second UE 1104 via multiple RISs 1106, 1108, 1110. The ranging measurements may be performed, e.g., by the range calculation component 1444 of the apparatus 1402. In some aspects, the UE may perform the ranging measurements with the second UE without knowledge of the location of the RIS(s).

In some aspects, the UE may obtain a location of the UE based on a RTT of the reference signal with each of multiple RISs, at 1310. The UE may transmit and receive the reference signal during a set of times during which one multiple RISs is activated, e.g., as described in connection with FIG. 12. The UE may perform range measurements based on measurements between the UE and each of the multiple RISs. The UE may obtain, e.g., determine, the location of the UE based on the range measurements with sets of RISs at different locations. FIG. 12 illustrates an example of a UE 1202 determining its location based on a RTT of a PRS with multiple RISs 1206, 1208, 1210. The UE may know the location of the RISs and use the locations and a range measurement of the UE with respect to the RISs to determine the location of the UE. The obtaining of the location may be performed, e.g., by the location component 1446 of the apparatus 1402 in FIG. 14.

In some aspects, the UE may indicate multiple time occurrences for ranging measurements with the second UE based on the activation time of each of the at least one RIS, e.g., at 1306. As described in connection with FIG. 11 or FIG. 12, the UE may select or otherwise indicate the time of the measurements. For example, the UE may indicate the timing to an RSU that activates/deactivates the RISs. In some aspects, the UE may configure the activation time for the at least one MS. The UE may receive an indication of the at least one RIS and one or more time instances that are configurable by the UE and may initiate the ranging operation with a second UE, where configuring the activation time includes indicating a sequence of activation times to a RSU. The indication may be performed, e.g., by the time component 1448 of the apparatus 1402 in FIG. 14.

In some aspects, the UE may receive information indicating the activation time for the at least one RIS, e.g., from an RSU, at 1302. FIGS. 11 and 12 illustrate examples in which the UE 1102 or 1202 may receive an indication of the activation time, at 1120 or 1220, from an RSU 1107 or RSU 1207. The reception of the information may be performed, e.g., by the time component 1448 via the reception component 1430 of the apparatus 1402 in FIG. 14.

The transmission of the reference signal, at 1308 may include transmitting the reference signal at a first time when the at least one RIS is activated, at 1314 and transmitting the reference signal at a second time when the at least one RIS is not activated, at 1318. The transmission may be performed, e.g., by the PRS component 1442 via the transmission component 1434 and RF transceiver 1422 of the apparatus 1402. FIG. 11 illustrates an example in which the UE 1102 transmits the PRS when the RISs 1106, 1108, and 1110 are activated and transmits the PRS at another time when the RISs are not activated. The UE may perform RTT measurements based on the reference signal at the first instance and the second instance to identify a location of the UE. In some aspects, the UE is a first UE that transmits the reference signal to a second UE, and the UE may further receive TDOA information from the second UE based on the reference signal at the first instance and the second instance. The reception may be performed, e.g., by the reception component 1430 of the apparatus 1402.

Figure 14:
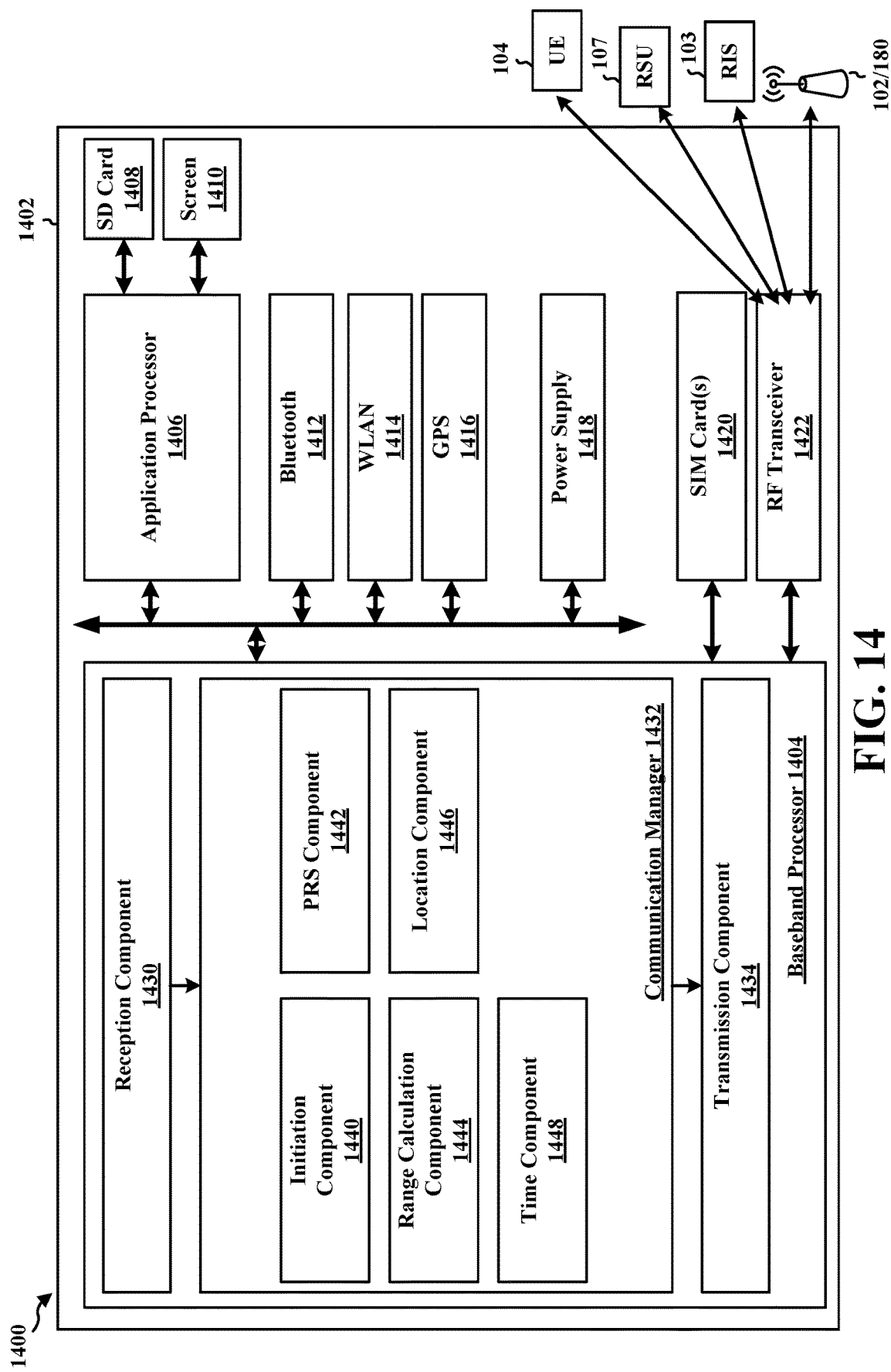
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, an apparatus that performs UE functionality, or another device configured to transmit and/or receive sidelink communication. The apparatus 1402 includes a baseband processor 1404 (also referred to as a modem) coupled to a RF transceiver 1422. In some aspects, the baseband processor 1404 may be a cellular baseband processor and/or the RF transceiver 1422 may be a cellular RF transceiver. The apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The baseband processor 1404 communicates through the RF transceiver 1422 with the UE 104 and/or BS 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described in the present application. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes an initiation component 1440 that is configured to initiate a ranging procedure, e.g., as described in connection with 1304 in FIG. 13A or 13B. The communication manager 1432 further includes a PRS component 1442 that is configured to transmit a reference signal at multiple time instances based on an activation time for at least one RIS, as described in connection with 1308 in FIG. 13A or 13B. The communication manager 1432 may further include a range calculation component 1444 that is configured to perform ranging measurements based on the reference signal, e.g., as described in connection with 1312 in FIG. 13A or 13B. The communication manager 1432 may further include a location component 1446 that is configured to obtain a location of the UE based on the on a RTT of the reference signal with each of multiple RISs, e.g., as described in connection with 1310 in FIG. 13A or 13B. The communication manager 1432 may further include a time component 1448 that is configured to indicate a time for the activation time of the at least one RIS or to receive information indicating the activation time for the at least one RIS, e.g., as described in connection with 1302 or 1306 in FIG. 13B.

The apparatus may include additional components that perform each of the blocks of the algorithm in the flowcharts of FIGS. 13A and 13B. As such, each block in the flowcharts of FIGS. 13A and 13B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband processor 1404, includes means for initiating a ranging operation; and means for transmitting a reference signal at multiple time instances based on an activation time for at least one RIS. The apparatus 1402 may further include means for performing ranging measurements with a second UE based on the reference signal. The apparatus 1402 may further include means for obtaining a location of the UE based on a RTT of the reference signal with each of multiple RISs. The apparatus 1402 may further include means for indicating multiple time occurrences for ranging measurements with the second UE based on the activation time of each of the at least one RIS. The apparatus 1402 may further include means for performing range measurements based on measurements between the UE and each of the multiple RISs. The apparatus 1402 may further include means for obtaining a location of the UE based on the range measurements with sets of RISs at different locations. The apparatus 1402 may further include means for receiving information indicating the activation time for the at least one RIS from a RSU. The apparatus 1402 may further include means for configuring the activation time for the at least one RIS. The apparatus 1402 may further include means for receiving an indication of the at least one RIS and one or more time instances that are configurable by the UE and means for initiating the ranging operation with a second UE, wherein configuring the activation time includes indicating a sequence of activation times to a RSU. The apparatus 1402 may further include means for performing RTT measurements based on the reference signal at the first instance and the second instance to identify a location of the UE. The apparatus 1402 may further include means for receiving TDOA information from the second UE based on the reference signal at the first instance and the second instance. The means may be one or more of the components of the apparatus 1402 configured to perform the functions recited by the means. As described herein, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15A:
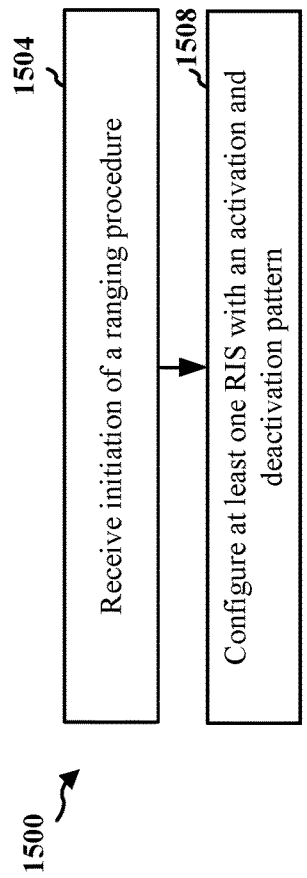
FIGS. 15A and 15B are flowcharts of methods of wireless communication in accordance with aspects presented herein.

FIG. 15A is a flowchart 1500 of a method of wireless communication. The method may be performed by a wireless device that activates/deactivates one or more RIS. In some aspects, the method may be performed by an RSU (e.g., the RSU 107, 907, 1007, 1107, 1207; or the apparatus 1602, which may include the memory, at least one processor, a transceiver, and/or at least one antenna).

At 1504, the wireless device receives an initiation of a ranging procedure from a UE. FIGS. 11 and 12 illustrate examples of initiation of a ranging procedure for a UE 1102 or 1202, and aspects of a ranging operation based on multiple RISs are described in connection with FIGS. 9-12. For example, the wireless device may initiate the ranging operation with a UE for the UE to determine a range between the UE and a second UE, e.g., as described in connection with FIG. 11. In some aspects, the procedure may be initiated to enable the UE may perform the procedure to determine a location of the UE, e.g., as described in connection with FIG. 12. The initiation may be performed, e.g., by the initiation component 1640 of the apparatus 1602 in FIG. 16.

At 1508, the wireless device configures at least one RIS with an activation and deactivation pattern. The configuration may be performed by the configuration component 1642 of the apparatus 1602 in FIG. 16. The wireless device may activate/deactivate the RISs based on a location of one or more UEs that will be involved in a ranging operation relative to the RISs. For example, if a first UE will perform measurements with a second UE, the configuration may be based on the location of the two UEs relative to the RISs. If a UE will obtain its location based on a PRS transmitted to multiple RISs, the configuration may be based on the location of the UE relative to the RISs.

Figure 15B:
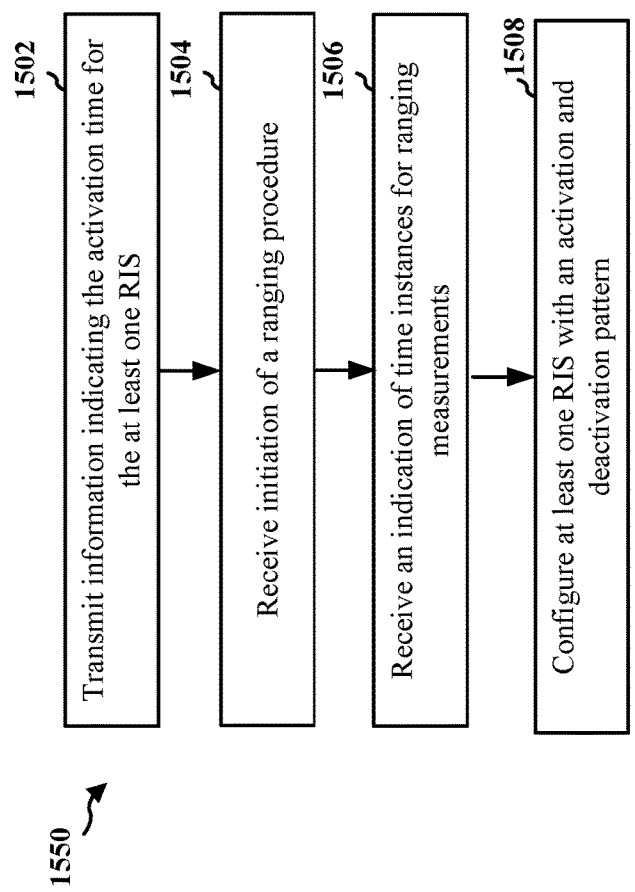

FIG. 15B illustrates a flowchart 1550 of a method of wireless communication. The method may be performed by a wireless device that activates/deactivates one or more MS. In some aspects, the method may be performed by an RSU (e.g., the RSU 107, 907, 1007, 1107, 1207; or the apparatus 1602, which may include the memory, at least one processor, a transceiver, and/or at least one antenna). Aspects that are described in connection with the flowchart 1500 in FIG. 15A are shown with the same reference number.

At 1504, the wireless device receives an initiation of a ranging procedure from a UE. FIGS. 11 and 12 illustrate examples of initiation of a ranging procedure for a UE 1102 or 1202, and aspects of a ranging operation based on multiple RISs are described in connection with FIGS. 9-12. For example, the wireless device may initiate the ranging operation with a UE for the UE to determine a range between the UE and a second UE, e.g., as described in connection with FIG. 11. In some aspects, the procedure may be initiated to enable the UE may perform the procedure to determine a location of the UE, e.g., as described in connection with FIG. 12. The initiation may be performed, e.g., by the initiation component 1640 of the apparatus 1602 in FIG. 16.

At 1508, the wireless device configures at least one RIS with an activation and deactivation pattern. The configuration may be performed by the configuration component 1642 of the apparatus 1602 in FIG. 16. The wireless device may activate/deactivate the RISs based on a location of one or more UEs that will be involved in a ranging operation relative to the RISs. For example, if a first UE will perform measurements with a second UE, the configuration may be based on the location of the two UEs relative to the RISs. If a UE will obtain its location based on a PRS transmitted to multiple RISs, the configuration may be based on the location of the UE relative to the RISs.

In some aspects, the wireless device may transmit, to the UE, information about an activation time for the at least one MS, at 1502. One or more of the pattern of the activation and the deactivation or the at least one RIS may be based on a relative position between a first UE and a second UE. The pattern of the activation and the deactivation may be based on a relative position between the UE and the at least one MS. The pattern of the activation and the deactivation may be based on a respective zone in which each of the at least one RIS is located. FIGS. 11 and 12 illustrate examples in which an RSU 1107 or 1207 may transmit, to a UE 1102 or 1202, an indication of the activation time, at 1120 or 1220. The transmission of the information may be performed, e.g., by the time component 1648 via the transmission component 1634 of the apparatus 1602 in FIG. 16.

In some aspects, the wireless device may receive, from the UE, an indication of time instances for ranging measurements prior to configuring the at least one RIS with the pattern of the activation and the deactivation, wherein the pattern of the activation and the deactivation includes the time instances indicated by the UE. As described in connection with FIG. 11 or FIG. 12, the RSU may receive an indication from the UE that selects or otherwise indicates time instances for the RIS to be activated. The reception of the indication may be performed, e.g., by the time component 1648 of the apparatus 1602 via the reception component 1630.

Figure 16:
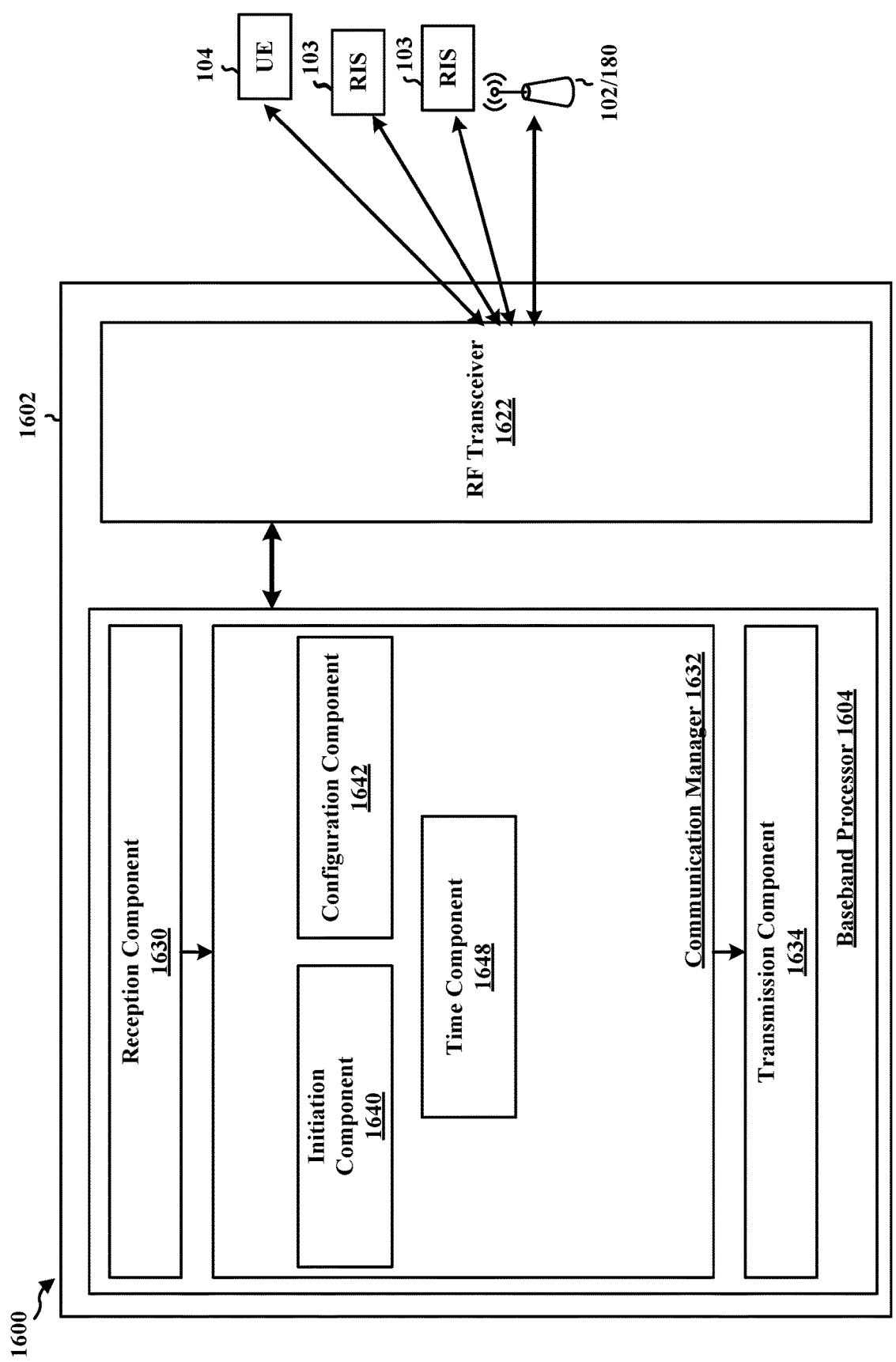
FIG. 16 is a diagram illustrating an example of a hardware implementation for an example apparatus in accordance with aspects presented herein.

FIG. 16 is a diagram 1600 illustrating an example of a hardware implementation for an apparatus 1602. The apparatus 1602 may be an RSU, a component of an RSU, an apparatus that implements RSU functionality, a base station, a component of a base station, may implement base station functionality, a controlling device for at least one RIS, etc. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the device 310 and may include the memory 376 and/or at least one of the TX processor 316, the RX processor 370, and the controller/processor 375.

The communication manager 1632 includes an initiation component 1640 that receives an initiation of a ranging procedure, e.g., as described in connection with 1504 in FIG. 15A or 15B. The communication manager 1632 further includes a configuration component 1642 that configures at least one RIS with an activation and deactivation pattern, e.g., as described in connection with 1508 in FIG. 15A or 15B. The communication manager 1632 may further includes a time component 1648 that is configured to transmit, to the UE, information about an activation time for the at least one RIS or to receive from the UE, an indication of time instances for ranging measurements, e.g., as described in connection with 1502 or 1506 in FIG. 15B.

The apparatus may include additional components that perform each of the blocks of the algorithm in the flowcharts of FIGS. 15A and 15B. As such, each block in the flowcharts of FIGS. 15A and 15B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving an initiation of a ranging procedure from a UE and means for configuring at least one RIS with an pattern of activation and deactivation. The apparatus 1602 may further include means for transmitting, to the UE, information about an activation time for the at least one RIS. The apparatus 1602 may further include means for receiving, from the UE, an indication of time instances for ranging measurements prior to configuring the at least one RIS with the pattern of the activation and the deactivation, wherein the pattern of the activation and the deactivation includes the time instances indicated by the UE. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: initiating a ranging operation; and transmitting a reference signal at multiple time instances based on an activation time for at least one RIS.

In aspect 2, the method of aspect 1 further includes that the at least one RIS includes a first RIS and a second RIS, and transmitting the reference signal based on the activation time for the at least one RIS includes: transmitting the reference signal at a first time when the first RIS is activated; and transmitting the reference signal at a second time when the second RIS is activated.

In aspect 3, the method of aspect 2 further includes that the UE is a first UE, the method further comprising: performing ranging measurements with a second UE based on the reference signal.

In aspect 4, the method of aspect 2 or aspect 3 further includes that obtaining a location of the UE based on a RTT of the reference signal with each of multiple RISs.

In aspect 5, the method of any of aspects 2-4 further includes indicating multiple time occurrences for ranging measurements with the second UE based on the activation time of each of the at least one RIS.

In aspect 6, the method of any of aspects 2-5 further includes that the activation time for each of the at least one RIS is based on a zone in which a respective RIS is located.

In aspect 7, the method of any of aspects 2-6 further includes UE transmits and receives the reference signal during a set of times during which one of multiple RISs is activated; and performing range measurements based on measurements between the UE and each of the multiple RISs.

In aspect 8, the method of aspect 7 further includes obtaining a location of the UE based on the range measurements with sets of RISs at different locations.

In aspect 9, the method of any of aspects 1-8 further includes receiving information indicating the activation time for the at least one RIS from an RSU.

In aspect 10, the method of any of aspects 1-8 further includes configuring the activation time for the at least one RIS.

In aspect 11, the method of aspect 10 further includes that the UE corresponds to a first UE, the method further comprising: receiving an indication of the at least one RIS and one or more time instances that are configurable by the UE; and initiating the ranging operation with a second UE, wherein configuring the activation time includes indicating a sequence of activation times to an RSU.

In aspect 12, the method of any of aspects 1-11 further includes that transmitting the reference signal based on the activation time for the at least one RIS includes: transmitting the reference signal at a first time when the at least one RIS is activated; and transmitting the reference signal at a second time when the at least one RIS is not activated.

In aspect 13, the method of aspect 12 further includes performing RTT measurements based on the reference signal at the first time and the second time to identify a location of the UE.

In aspect 14, the method of aspect 12 or aspect 13 further includes that the UE is a first UE that transmits the reference signal to a second UE, the method further comprising: receiving TDOA information from the second UE based on the reference signal at the first time and the second time.

Aspect 15 is an apparatus for wireless communication comprising means to perform the method of any of aspects 1-14.

In aspect 16, the apparatus of aspect 15 further includes at least one antenna and at least one transceiver coupled to the at least one antenna.

Aspect 17 is an apparatus for wireless communication comprising memory and at least one processor configured to perform the method of any of aspects 1-14.

In aspect 18, the apparatus of aspect 17 further includes at least one antenna and at least one transceiver coupled to the at least one antenna and the at least one processor.

Aspect 19 is a non-transitory computer-readable storage medium storing computer executable code, the code when executed by a processor causes the processor to perform the method of any of aspects 1-14.

Aspect 20 is a method of wireless communication, comprising: receiving an initiation of a ranging procedure from a UE; and configuring at least one RIS with an pattern of activation and deactivation.

In aspect 21, the method of aspect 20 further includes transmitting, to the UE, information about an activation time for the at least one RIS.

In aspect 22, the method of aspect 21 further includes that one or more of the pattern of the activation and the deactivation or the at least one RIS is based on a relative position between a first UE and a second UE.

In aspect 23, the method of aspect 21 or 22 further includes that the pattern of the activation and the deactivation is based on a relative position between the UE and the at least one RIS.

In aspect 24, the method of any of aspects 20-24 further includes that the pattern of the activation and the deactivation is based on a respective zone in which each of the at least one RIS is located.

In aspect 25, the method of aspect 20 or aspect 21 further includes receiving, from the UE, an indication of time instances for ranging measurements prior to configuring the at least one RIS with the pattern of the activation and the deactivation, wherein the pattern of the activation and the deactivation includes the time instances indicated by the UE.

In aspect 26, the method of any of aspects 20-25 further includes that the method is performed by an RSU.

Aspect 27 is an apparatus for wireless communication comprising means to perform the method of any of aspects 20-26.

In aspect 28, the apparatus of aspect 27 further includes at least one antenna and at least one transceiver coupled to the at least one antenna.

Aspect 29 is an apparatus for wireless communication comprising memory and at least one processor configured to perform the method of any of aspects 20-26.

In aspect 30, the apparatus of aspect 29 further includes at least one antenna and at least one transceiver coupled to the at least one antenna and the at least one processor.

Aspect 31 is a non-transitory computer-readable storage medium storing computer executable code, the code when executed by a processor causes the processor to perform the method of any of aspects 20-26.

What is claimed is:

1. An apparatus for wireless communication at a first user equipment (UE), comprising:
memory; and
at least one processor coupled to the memory and configured to:
initiate a ranging operation; and
transmit, as a part of the ranging operation, a reference signal at multiple time instances based on an activation time and a deactivation time for at least one reconfigurable intelligent surface (RIS); and
determine a range measurement or a location for the first UE based on reflections of the reference signal from the at least one RIS or a response, to the reference signal, from a second UE via the at least one RIS.

2. The apparatus of claim 1, wherein the at least one RIS includes a first RIS and a second RIS, and to transmit the reference signal based on the activation time for the at least one RIS, the memory and the at least one processor are further configured to:
transmit the reference signal at a first time when the first RIS is activated and the second RIS is deactivated; and
transmit the reference signal at a second time when the second RIS is activated and the second RIS is deactivated.

3. The apparatus of claim 1, wherein the at least one processor is further configured to:
perform ranging measurements with the second UE via the at least one RIS based on the reference signal.

4. The apparatus of claim 3, wherein the at least one processor is further configured to:
obtain the location of the first UE based on a round trip time (RTT) of the reference signal with each of multiple RISs.

5. The apparatus of claim 3, wherein the at least one processor is further configured to:
indicate multiple time occurrences for ranging measurements with the second UE based on the activation time of each of the at least one RIS.

6. The apparatus of claim 2, wherein the activation time for each of the at least one RIS is based on a zone in which a respective RIS is located.

7. The apparatus of claim 2, wherein the at least one processor is further configured to transmit and receive the reference signal during a set of times during which one of multiple RISs is activated; and
perform range measurements based on measurements between the first UE and each of the multiple RISs.

8. The apparatus of claim 7, wherein the at least one processor is further configured to:
obtain the location of the first UE based on the range measurements with sets of RISs at different locations.

9. The apparatus of claim 1, wherein the at least one processor is further configured to:
receive information indicating the activation time for the at least one RIS from a road side unit (RSU).

10. The apparatus of claim 1, wherein the at least one processor is further configured to:
configure the activation time for the at least one RIS.

11. The apparatus of claim 10, wherein the at least one processor is further configured to:
receive an indication of the at least one RIS and one or more time instances that are configurable by the first UE; and
initiate the ranging operation with the second UE, wherein configuring the activation time includes indicating a sequence of activation times to a road side unit (RSU).

12. The apparatus of claim 1, wherein to transmit the reference signal based on the activation time for the at least one RIS, the at least one processor is configured to:
transmit the reference signal at a first time when the at least one RIS is activated; and
transmit the reference signal at a second time when the at least one RIS is not activated.

13. The apparatus of claim 12, wherein the at least one processor is further configured to:
perform round trip time (RTT) measurements based on the reference signal at the first time and the second time to identify the location of the first UE.

14. The apparatus of claim 12, wherein the reference signal is directed to the second UE, and the at least one processor is further configured to:
receive time difference of arrival (TDOA) information from the second UE based on the reference signal at the first time and the second time.

15. The apparatus of claim 1, further comprising:
at least one antenna; and
a transceiver coupled to the at least one antenna and the at least one processor.

16. A method of wireless communication at a first user equipment (UE), comprising:
initiating a ranging operation; and
transmitting, as a part of the ranging operation, a reference signal at multiple time instances based on an activation time and a deactivation time for at least one reconfigurable intelligent surface (RIS); and
determining a range measurement or a location for the first UE based on reflections of the reference signal from the at least one RIS or a response, to the reference signal, from a second UE via the at least one RIS.

17. The method of claim 16, wherein the at least one RIS includes a first RIS and a second RIS, and transmitting the reference signal based on the activation time for the at least one RIS includes:
transmitting the reference signal at a first time when the first RIS is activated; and
transmitting the reference signal at a second time when the second RIS is activated.

18. The method of claim 17, further comprising:
performing ranging measurements with the second UE based on the reference signal.

19. The method of claim 18, further comprising:
obtaining the location of the first UE based on a round trip time (RTT) of the reference signal with each of multiple RISs.

20. The method of claim 16, wherein transmitting the reference signal based on the activation time for the at least one RIS includes:
transmitting the reference signal at a first time when the at least one RIS is activated; and
transmitting the reference signal at a second time when the at least one RIS is not activated.

21. The method of claim 20, further comprising:
performing round trip time (RTT) measurements based on the reference signal at the first time and the second time to identify the location of the first UE.

22. An apparatus for wireless communication, comprising:
 memory; and
 at least one processor coupled to the memory and configured to:
 receive an initiation of a ranging procedure from a first user equipment (UE); and
 configure, for the ranging procedure, at least one reconfigurable intelligent surface (RIS) with a pattern of activation and deactivation switching the at least one RIS on and off.

23. The apparatus of claim 22, wherein the at least one processor is further configured to:
 transmit, to the first UE, information about an activation time for the at least one RIS.

24. The apparatus of claim 23, wherein one or more of the pattern of the activation and the deactivation or the at least one RIS is based on a relative position between the first UE and a second UE.

25. The apparatus of claim 23, wherein the pattern of the activation and the deactivation is based on a relative position between the first UE and the at least one RIS.

26. The apparatus of claim 22, wherein the pattern of the activation and the deactivation is based on a respective zone in which each of the at least one RIS is located.

27. The apparatus of claim 22, wherein the at least one processor is further configured to:
 receive, from the first UE, an indication of time instances for ranging measurements prior to configuring the at least one RIS with the pattern of the activation and the deactivation, wherein the pattern of the activation and the deactivation includes the time instances indicated by the first UE.

28. The apparatus of claim 22, wherein the apparatus is associated with a road side unit (RSU).

29. The apparatus of claim 22, further comprising:
 at least one antenna; and
 a transceiver coupled to the at least one antenna and the at least one processor.

30. A method of wireless communication, comprising:
 receiving an initiation of a ranging procedure from a user equipment (UE); and
 configuring, for the ranging procedure, at least one reconfigurable intelligent surface (RIS) with a pattern of activation and deactivation switching the at least one MS on and off.

* * * * *